United States Patent [19]

Chun

[11] Patent Number: 4,698,816
[45] Date of Patent: * Oct. 6, 1987

[54] OPTICAL TRANSMISSION FILTER

[75] Inventor: Myung K. Chun, Manlius, N.Y.

[73] Assignee: General Electric Co., Schenectady, N.Y.

[*] Notice: The portion of the term of this patent subsequent to Mar. 11, 2003 has been disclaimed.

[21] Appl. No.: 642,332

[22] Filed: Aug. 20, 1984

Related U.S. Application Data

[63] Continuation-in-part of Ser. No. 450,972, Dec. 20, 1982, abandoned.

[51] Int. Cl.⁴ ............................................... H01S 3/098
[52] U.S. Cl. ....................................... 372/19; 372/101; 372/105; 350/400; 350/403; 350/416
[58] Field of Search .................... 372/19, 20, 101, 105; 350/311, 317, 480, 481, 402, 403, 400, 416, 505; 353/20

[56] References Cited

U.S. PATENT DOCUMENTS 3,466,565  9/1969  Rigrod .................................. 372/19
3,868,592  2/1975  Yarbrough et al. ................... 372/20
4,461,009  7/1984  Lundstrom ........................... 372/106

Primary Examiner—Robert E. Wise
Attorney, Agent, or Firm—I. D. Blumenfeld

[57] ABSTRACT

The present invention deals with an optical transmission filter for effecting differential phase delay upon light in a beam polarized in a P dimension, as a function of position within the filter aperture. The filter employs two lenses of birefringent material, the crystal optic axes of the respective lens materials being oriented in mutually orthogonal positions and at a 45° angle to the P dimension. The lenses have their adjacent surfaces respectively concave and convex with the same radius of curvature and their non-adjacent surfaces flat.

The phase response of the filter is a function of the radial distance of a beam element from the filter axis with spherical lenses and a function of a linear coordinate distance from the filter axis with cylindrical lenses. A two-part construction for one lens, which permits adjustment of the difference in center thicknesses between the two lenses, allows adjustment of the differential phase delay with respect to a spacial reference.

13 Claims, 29 Drawing Figures

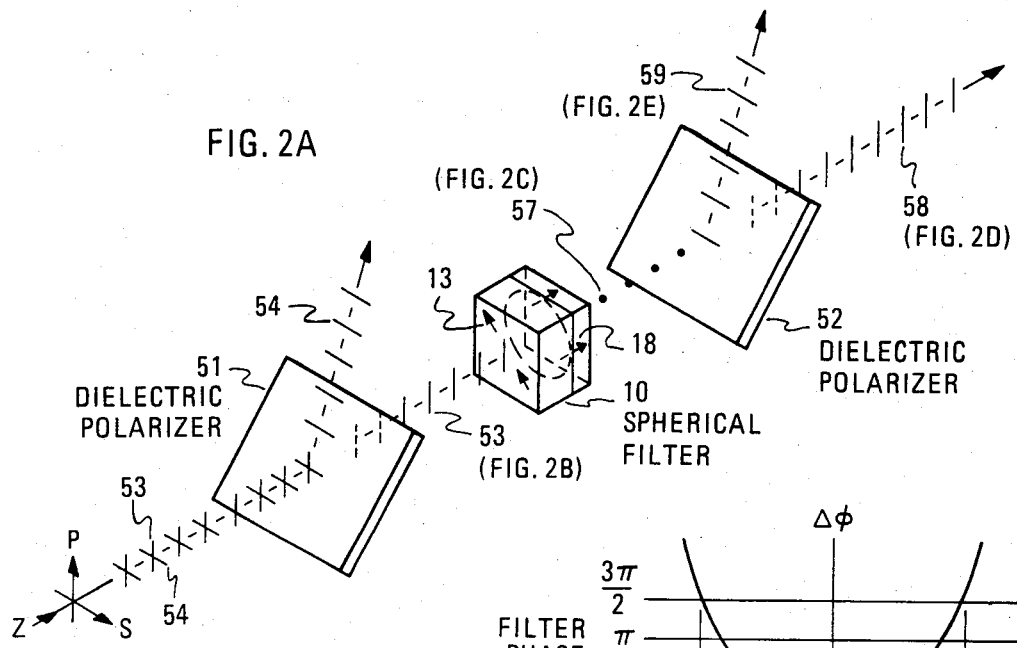
FIG. 2A
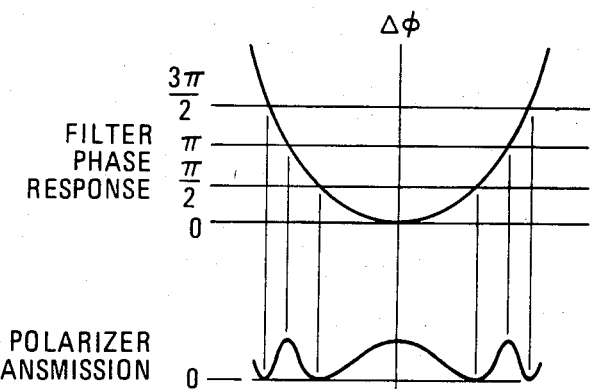
FIG. 3C
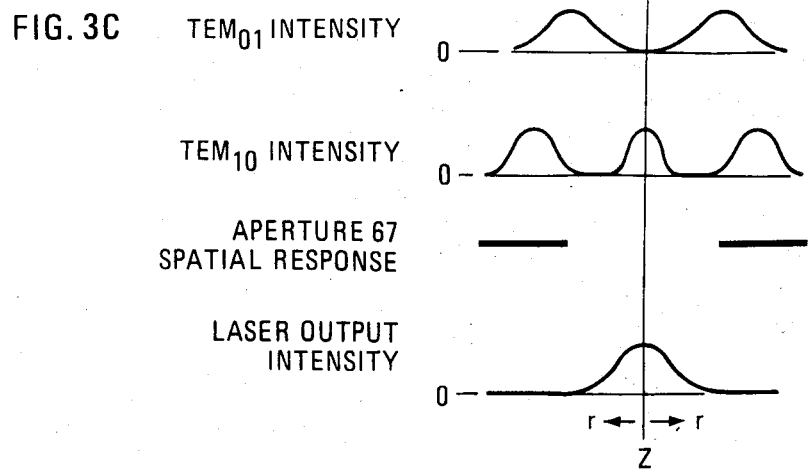

FIG. 2B
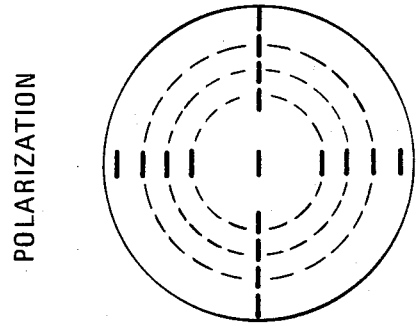
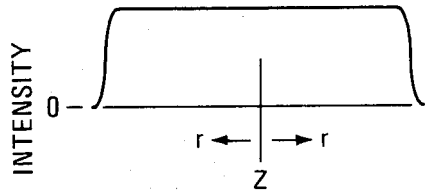
FIG. 2E
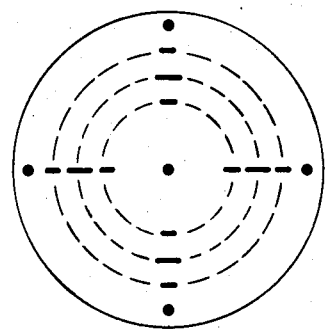
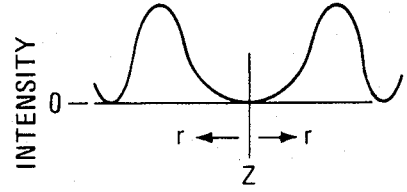
FIG. 2C
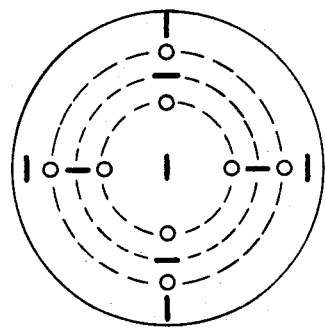
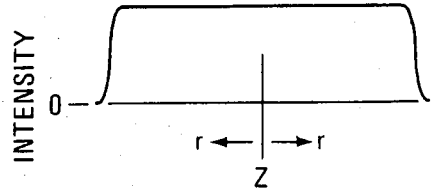
FIG. 2D
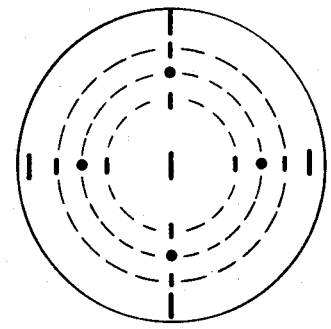
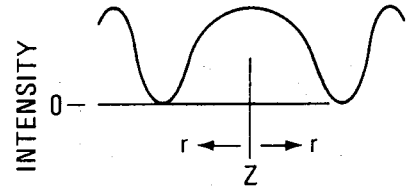

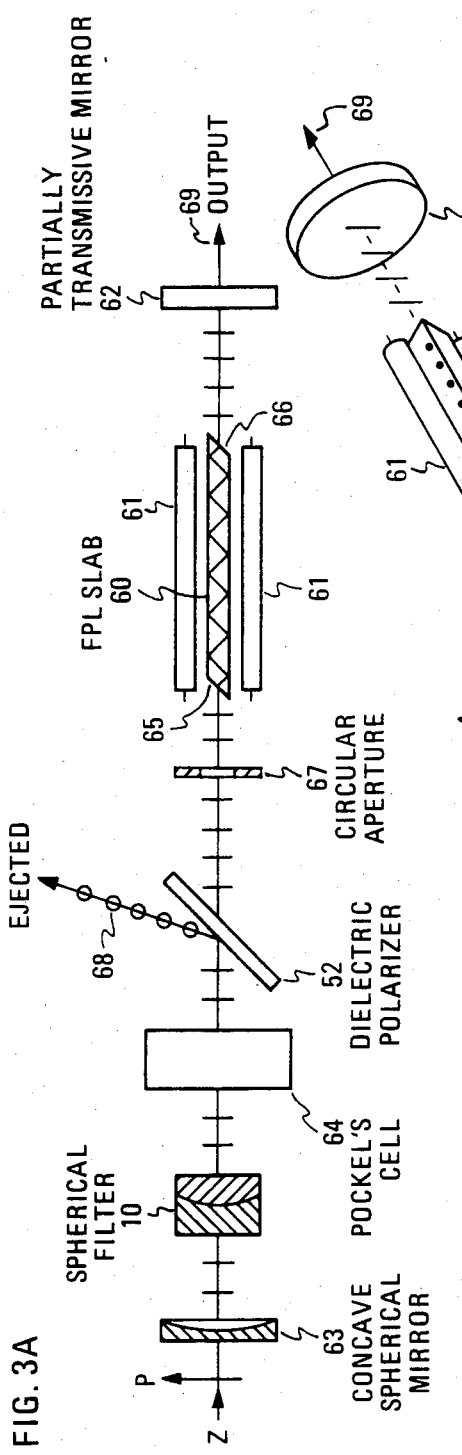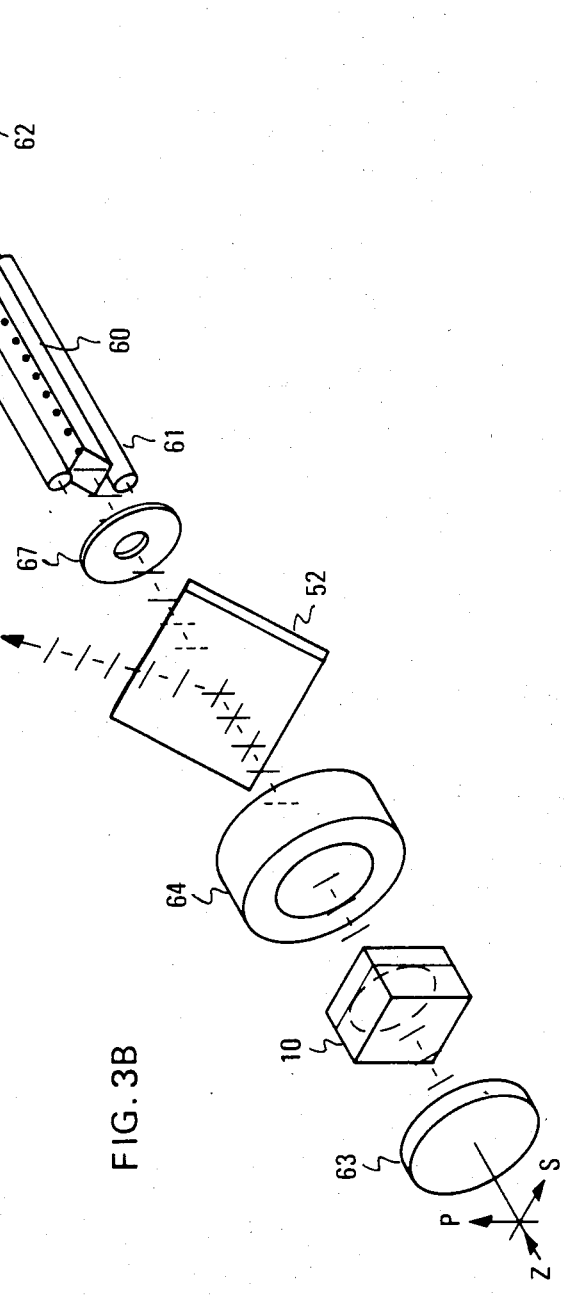
FIG. 3A
FIG. 3B

FIG. 4A FLASHLAMP PUMP LIGHT OUTPUT
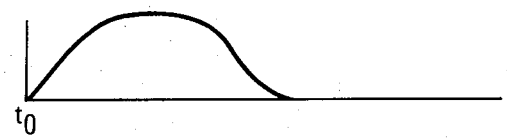
FIG. 4B OPTICAL GAIN IN LASER GAIN MEDIUM
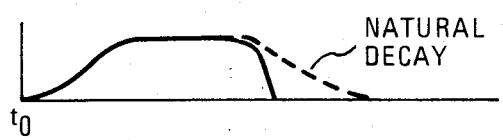
FIG. 4C TRIGGER PULSE FOR POCKEL'S CELL CONTROL CIRCUIT
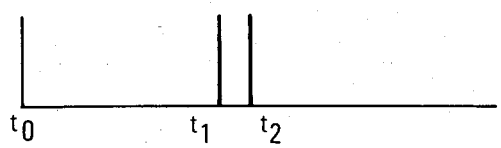
FIG. 4D POCKEL'S CELL VOLTAGE
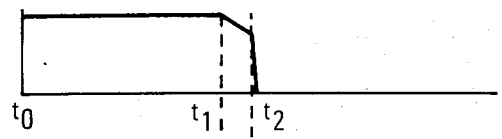
FIG. 4E INDUCED LOSS IN LASER RESONATOR CAVITY
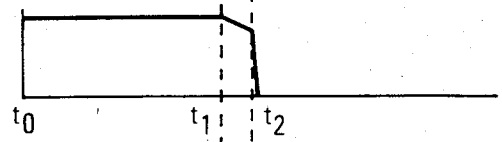
FIG. 4F PULSE OUTPUT FROM LASER CAVITY
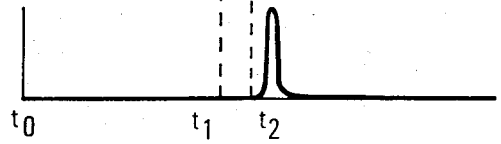
FIG. 5
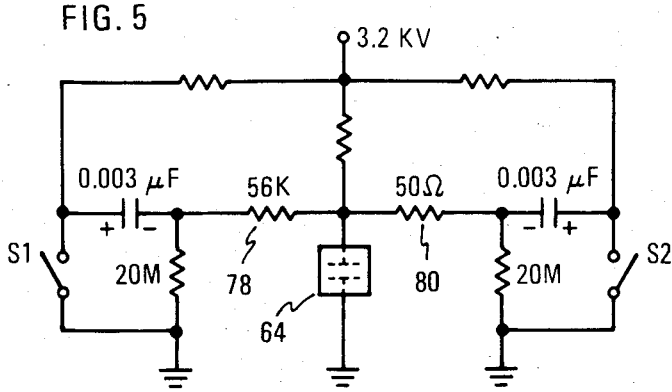

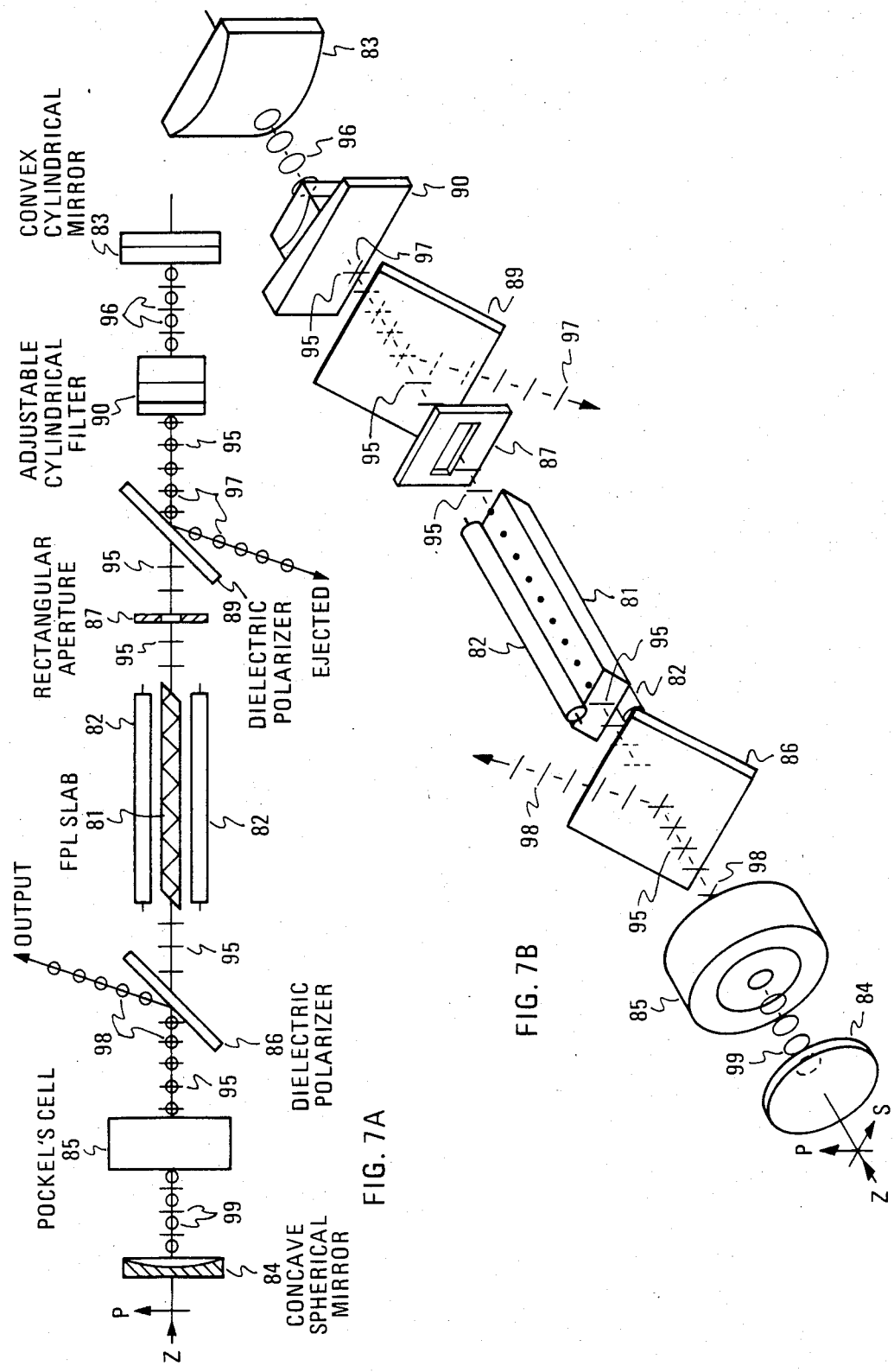

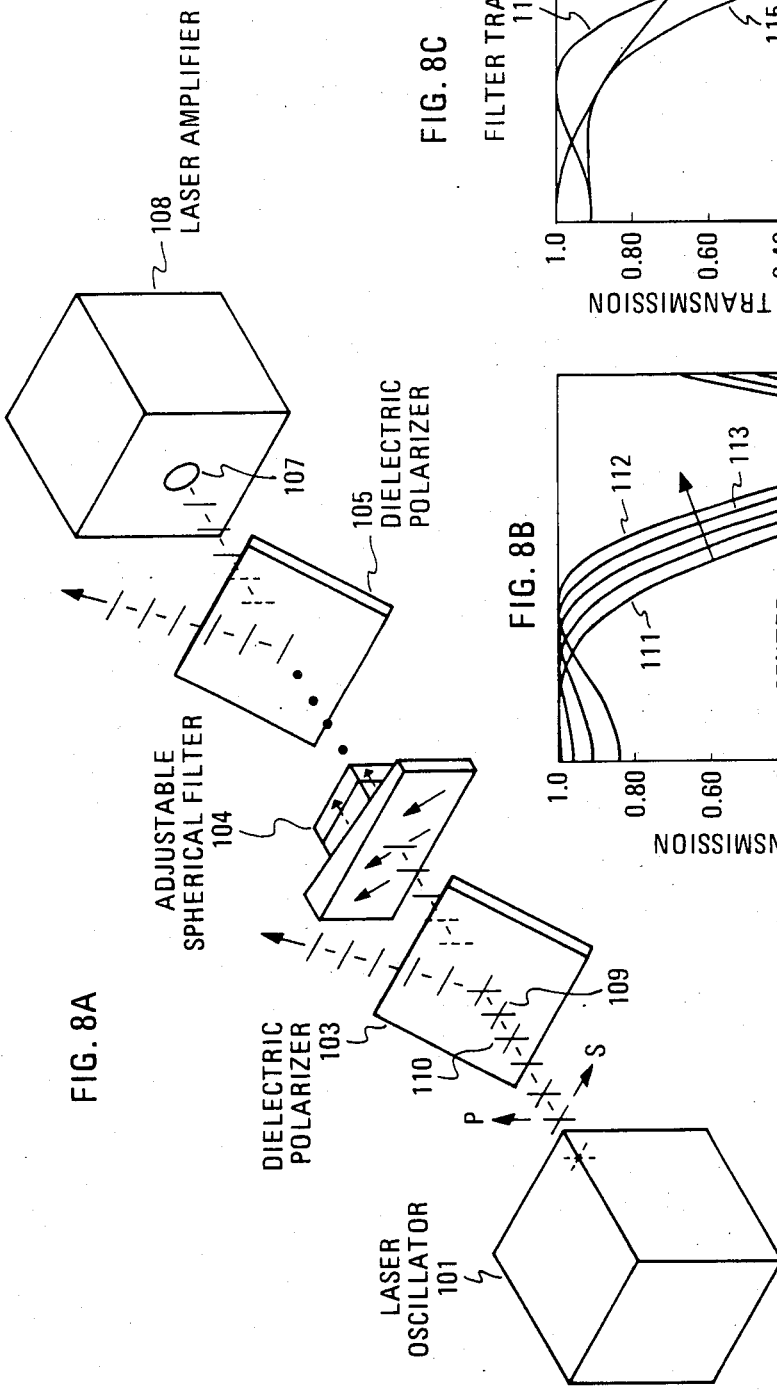

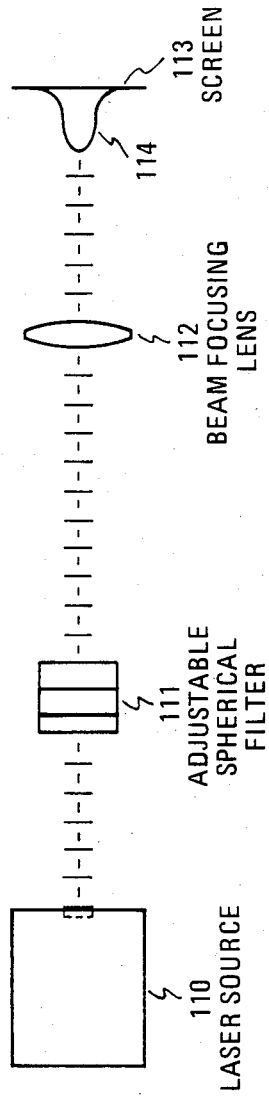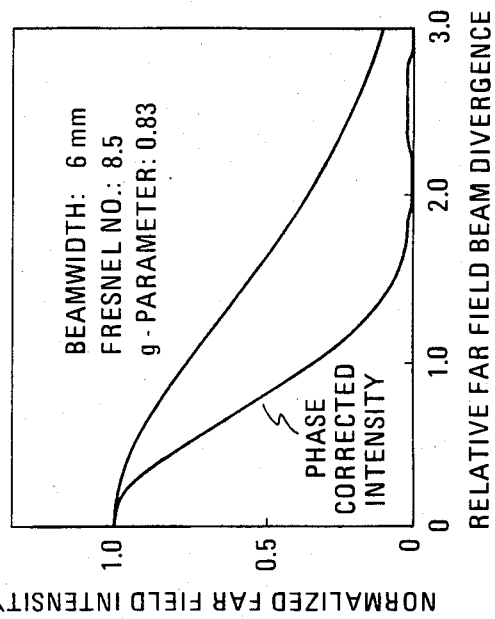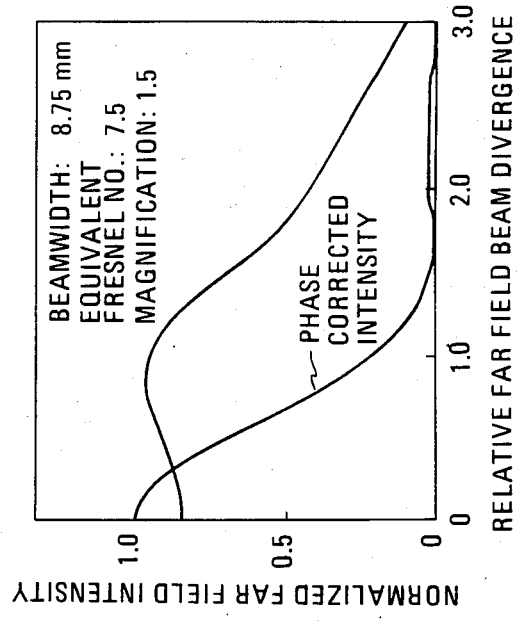

OPTICAL TRANSMISSION FILTER

CROSS REFERENCE TO RELATED APPLICATIONS

This is a continuation in part of copending U.S. patent application Ser. No. 450,972, now abandoned filed Dec. 20, 1982 on an invention of Myung K. Chun entitled "Single Transverse Mode Laser".

This application is related to a second continuation in part of copending application Ser. No. 450,972, said second continuation in part being on an invention of Myung K. Chun entitled "Optical Filter Polarizer Combination and Laser Apparatus Incorporating This Combination", filed concurrently herewith, now U.S. Pat. No. 4,575,849.

The present application is also related to the commonly assigned application of Myung K. Chun and Sujane C. Wang entitled "Optical Transmission Filter For Far Field Beam Correction", filed concurrently herewith, now U.S. Pat. No. 4,643,534.

BACKGROUND OF THE INVENTION

1. Field of Invention

The invention relates to optical transmission filters for systems employing polarized coherent beams, and more particularly to filters exhibiting a differential phase delay to the components of a polarized beam element as a function of element position within the filter aperture. The invention further relates to adjustable optical transmission filters.

2. Description of The Prior Art

The invention is applicable to optical systems, such as lasers employing polarized coherent radiation. In lasers, the optical resonator acting to provide optical feedback for the gain medium aids in establishing an internal beam and the two influence the characteristics of the beam produced. Since the external beam derived from the laser is derived from the internal beam, the resonator and the gain medium also affect the nature of the external beam.

An ideal characteristic of a laser apparatus is that it have a large natural aperture and produce a large, high energy high quality beam. The "larger" the beam, the higher the energy, and the smaller the far field beam divergence (ideally a minimum), the aperture being the critical parameter in defining this beam property. Beam quality is a relative term used to characterize a beam in reference to a standard beam. Beams resulting from operation of an optical resonator in a pure $TEM_{00}$ mode for instance, may be represented as providing a standard beam referred to as "Gaussian". In a "Gaussian" beam, the intensity peaks in the center of the beam and gradually decreases to the margin of the beam. Meanwhile, the phase of the "Gaussian" beam remains relatively constant at the center of the beam and then changes rapidly at the perimeter of the beam to a large value leading to a phase reversal. Conversely, in an intensity profile of the beam, the phase is changing most rapidly where the beam intensity is approaching a minimum. In a beam showing evidence of multi-moding, the intensity then may reappear as a second fringe whose phase may be displaced 180° from the phase of the central fringe.

In practical apparatus, the beams are often of substantially poorer quality than standard "Gaussian" beams, unless correction is provided. Typical issues in the design of an optical resonator, which influence beam quality, are whether the optical resonator is stable, unstable, or a combination of the two termed "stable/unstable". Typical issues in the design of the gain medium are whether the medium is circular or square or rectangular in cross-section, whether it has slanted end faces, (cut at the Brewster angle), and the presence of thermal focusing effects as the medium is operated. In all such designs, the quality of the beam is likely to suffer as the aperture of the system is increased or as the power is increased. In laser systems, polarized operation is frequently desirable in that it permits electro-optically "Q-switched" operation and aids in achieving improved laser operation, the improvement being in improved beam quality and increased power.

Accordingly, within the optical resonator where the beam is formed, in the near field where a beam is coupled from an optical resonator to a utilization device and in the far field, means for adjusting the phase of a wavefront may be of advantage in improving operation of a laser or a laser system.

A further problem posed in practical laser systems, is the requirement of fractional wave accuracy in the phase correction means itself, making it desirable that the correction filter be adjustable to simplify its own fabrication. Adjustability has the additional advantage, in the event that the system parameters are not accurately known, of making the filter more adaptable to the actual system requirements.

SUMMARY OF THE INVENTION

Accordingly, it is an object of the invention to provide a novel optical transmission filter applicable to polarized coherent radiation having a phase response which is a function of the position of a radiation element relative to the filter axis.

A further object of the invention is to provide a novel optical transmission filter applicable to polarized coherent radiation, in which a differential phase delay is provided, which is a continuous function of the radial distance of each radiation element from the filter axis.

It is still another object of the invention to provide a novel optical transmission filter applicable to polarized coherent radiation in which differential phase delay is provided which is a continuous function of a coordinate in a plane orthogonal to the filter axis.

It is an additional object of the present invention to provide a novel optical transmission filter applicable to polarized coherent radiation having adjustable phase response.

These and other objects of the invention are achieved in a novel optical transmission filter for effecting continuous phase compensation of a beam of light, polarized in a P dimension, the filter having an optical axis which is concentric with the beam axis. The filter comprises a first lens of birefringent material of a first center thickness having a surface, which has a predetermined radius of curvature, and a second lens of birefringent material of a second center thickness, having a surface, which has a radius of curvature equal to the radius of curvature of the first lens but of opposite sign. The lenses are oriented orthogonal to and concentric with the axis of the beam with the curved surfaces adjacent.

In addition, the crystal optical axes of the materials of the lenses are oriented in mutually orthogonal positions along the axis and at an angle of 45° to a P dimension. The surfaces of the filter lenses, depending upon the filter characteristic sought, may be spherical or cylindrical.

The phase response of the filter, will have a zero differential phase delay at a zero coordinate value (or zero radius with reference to the filter axis) when the center thicknesses of the lenses are equal. The phase response may have a non-zero differential phase delay on the axis (and a zero differential phase delay at some other coordinate value), when the center thicknesses of the lenses are unequal. Accordingly, if one desires to translate the differential phase delay characteristic by adding or subtracting a fixed reference delay, the transmission filter may be made to have one lens of adjustable center thickness. This may be accomplished by the compound design of one lens in which the lens consists of a wedged shaped (plane faced) member tapering at an angle equal to the tapering angle of the other lens member which provides the curvature. The joint tapering restores the filter surfaces to orthogonality to the filter axis. When the tapering angle is made sufficiently small, a very fine adjustment of the spacial reference of the filter characteristic, may be obtained.

BRIEF DESCRIPTION OF THE DRAWINGS

The novel and distinctive features of the invention are set forth in the appended claims. The invention itself, however, together with further objects and advantages thereof may best be understood by reference to the following description and accompanying drawings, in which:

FIG. 1A is a two lens optical transmission filter using orthogonally arranged birefringent materials, the lenses having mating spherical surfaces with fixed, on-axis thicknesses;

FIG. 1B is a three element variation of the optical transmission filter illustrated in FIG. 1A, wherein a slideable wedge cooperating with a wedge shaped lens provides a compound lens, whose on-axis thickness is adjustable in relation to the other lens;

FIG. 1C is a two lens optical transmission filter similar to that illustrated. in FIG. 1A but having mating cylindrical surfaces, the lenses having fixed on-axis thicknesses; and FIG. 1D is a three element variation of the optical transmission filter illustrated in FIG. 1C, wherein a slideable wedge, cooperating with a wedge shaped lens provides a compound lens, whose on-axis thickness is adjustable in relation to the other lens;

FIG. 2A is a perspective view of a portion of a coherent optical system combining an optical transmission filter, which is spherical, and a polarizer, the combination producing a positionally dependent attenuation function in reference to the system axis;

FIGS. 2B through 2E are auxiliary illustrations of the nature of the beam as it proceeds through the optical components illustrated in FIG. 2A, the filter having spherical surfaces. The illustrations show respectively the polarization rotation and the intensity of individual rays forming the beam as a function of their position, FIG. 2B after a first polarizer, 2C after the filter, 2D after passage through the second polarizer, and 2E upon reflection at the second polarizer;

FIGS. 3A and 3B are respectively side elevation and perspective views of a stable, Q-switched laser resonator utilizing polarized light and incorporating a spherical optical transmission filter-polarizer combination for supporting resonator operation in a TEM$_{00}$ mode and for suppression of other modes, and FIG. 3C is a graph illustrating the operation of the optical resonator components in mode suppression;

FIGS. 4A tnrough 4F illustrate the Q-switching sequence of the FIG. 3A–3B embodiment, FIG. 4A showing the pump light output, 4B the optical gain, 4C the trigger pulse, 4D the Pockel's cell voltage, 4E the loss and 4F the laser output pulse;

FIG. 5 is a schematic diagram illustrating a control circuit for the Pockel's cell of the FIG. 3A–3B embodiment designed to favor TEM$_{00}$ mode operation;

FIGS. 7A and 7B are respectively side elevation and perspective views of a stable/unstable resonator incorporating a face pumped laser and incorporating a cylindrical optical transmission filter-polarizer combination for improved resonator performance;

FIG. 8A illustrates a laser system incorporating a spherical optical transmission filter-polarizer combination, in which the lenses of the optical transmission filter have an adjustable on-axis thickness. The filter-polarizer combination is used to increase the extraction efficiency of the amplifier by increasing the "fill factor" of the active material of the amplifier.

FIG. 8B illustrates the variation of the transmission profile of the filter-polarizer combination of FIG. 8A as a function of change in the center thickness difference between the two lenses of the optical filter; and FIG. 8C illustrates the intensity of the input beam, the filter transmission and the intensity of the transmitted beam in the laser system of FIG. 8A at a preferred adjustment of the filter; and FIG. 9A illustrates a laser system in which a spherical optical transmission filter is employed to enhance the quality of a beam produced by a polarized coherent source;

FIG. 9B illustrates the correction of far field divergence of a beam produced by an unstable laser resonator having a Fresnel number of 7.5 (magnification 1.5) by a spherical optical transmission filter;

FIG. 9C illustrates the correction of far field divergence of a beam produced by a stable laser resonator having a Fresnel number of 8.5 by a spherical optical transmission filter.

DESCRIPTION OF THE PREFERRED EMBODIMENT

The optical transmission filters disclosed in FIGS. 1A, 1B, 1C and 1D are two or three piece optical components designed for use with beams of polarized coherent light centered on the axis of the filters. The filters each include a pair of mating lenses of doubly refracting material whose crystal optic axes are mutually orthogonal and whose mating surfaces are either spherical (convex - concave respectively) or cylindrical (convex - concave respectively).

Figure 1A:
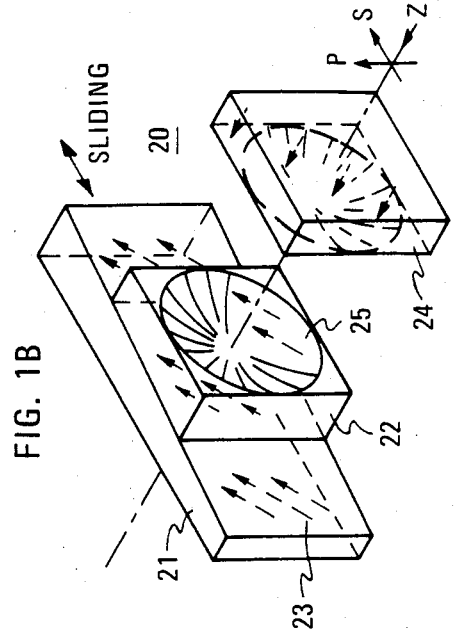
FIGS. 1A, 1B, 1C and 1D are optical transmission filters for application to laser systems producing polarized coherent light.

The optical transmission filter 10 of FIG. 1A, using two spherically surfaced lenses, has a differential phase response to light of a preferred polarization which is a function of the radial coordinate of a ray within the filter field. The function is symmetrical about the axis of the filter. In particular, when the rays are located on the filter axis, a near zero change in differential phase delay is exhibited between the two selected orthogonal components of the preferred polarization. As will be seen, the selected components are oriented 45° angle to the preferred (P) polarization and are in alignment with the crystal optic axes of the doubly refracting materials. In one example, the differential phase delay between these selected components, increases as the radial coordinate of the ray measured from the filter axis increases, the differential delays being equal at the same radial coordinate irrespective of the angular position about the filter axis. The wave transmission filter may be employed to bring about a rotation of the polarization vector by 90° in one passage through the filter of a ray at the perimeter of the filter field (analogous to a "half wave plate") or to bring about a comparable differential delay upon two passages through the filter of a ray at the perimeter of the filter field (analogous to a "quarter wave plate").

The wave transmission filter 30, using cylindrically surfaced lenses (e.g. FIG. 1C), has a phase response to light of a preferred polarization which is a function of a transverse coordinate (the S coordinate) of a ray within the filter field. The function is symmetrical about the filter axis. In one example, a near zero differential phase occurs between two selected orthogonal components of the preferred polarization when the rays are located on the filter axis, differential phase delay increasing as the S coordinate of the ray measured from the filter axis increases.

Both the spherical (10) and cylindrical (30) filters are available in an adjustable configuration. In the adjustable configurations (20, 40), one lens has an adjustable thickness permitting one to adjust the on-axis differential delay to a value in which the differential phase shift between the desired orthogonal components is zero, positive, or negative.

The filters 10, 20, 30 and 40, may be used in combination with suitable polarizers to convert the phase response to an amplitude response having the same coordinate dependance. The filters herein described may be applied as an optical component within an optical resonator of a laser, in the path between an optical resonator and an optical amplifier, or for far field correction.

The optical transmission filter 10, illustrated in FIG. 1A, is a two piece spherical unit in which the lenses 12, 14 are of equal thickness at their centers. The centers are aligned upon the axis Z of the associated optical system. The lens 12 placed to the left in the filter 10 has a first surface 11 to the left (and hidden in the Figure), which is flat and a second surface 16 to the right which is spherically concave with a predetermined radius of curvature (R). The surfaces of the lens 12 are oriented orthogonal to the optical axis (Z).

The lens 12 has its crystal optic axis oriented at a 45° angle to the P and S axes. The P and S axes are established in the associated optical system by the orientation of the laser medium, which in the case of a face pumped square slab laser, with ends cut at the Brewster angle, lie in planes parallel to the lateral surfaces of the slab. The P coordinate is oriented in a vertical plane, using the orientations of FIGS. 1A and 3A, between the upper and lower (lateral) surfaces of the laser slab and the S coordinate is oriented in a horizontal plane between the front and back (lateral) surfaces of the laser slab. These coordinates define the P and S, polarization vectors which are of interest in the following description. The crystal optic axis of the doubly refracting material of the lens 12 is illustrated by the arrows 13. This axis is oriented at 45° to the P-S coordinates.

The second lens 14, placed to the right in the filter 10, has a first surface 15 to the left (and hidden in the Figure), which is spherically convex with a radius of curvature R equal to the first lens but of opposite sign. When the two lenses 12 and 14 are assembled together, the surfaces 15, 16 are designed to fit closely together. The second surface 17 of the second lens 14 to the right, is flat. The surfaces (15, 17) of the lens 14 are oriented orthogonal to the Z axis.

The lens 14 has its crystal optic axis oriented at a 45° angle to the P and S axes. This axis, as indicated by the arrows 18, is oriented orthogonal to the crystal optic axis of the lens 12.

The optical transmission filter 10, which is constructed of the two lenses 12 and 14, exhibits a positionally dependent differential phase shift to the selected components of rays of polarized light passing through the system. The differential phase shift produced is a function of the distance of a ray from the filter axis. Assuming in a first example, equal radii of curvature for the concave and convex spherical surfaces of the lenses 12 and 14, and an exact match between the thickness of the two lenses at their centers, then the differential phase shift provided to the selected orthogonal components will be zero at the filter center, coincident with the Z axis. However, if a ray is located at the peripheral portion of the filter field, the ray will pass through a greater thickness in the first lens than in the second lens and experience the greatest differential phase shift contemplated by the design. When a ray of P polarization is resolved into two selected orthogonal components parallel to the crystal optic axes of the two doubly refracting materials and then recombined, the resultant will produce a polarization rotation of 90°. This will occur when one of the selected orthogonal components experiences a differential phase shift of 180° in relation to the other, which produces a polarization rotation of 90° upon recombination, resulting in an S polarization.

A phase rotation of 90° may occur either upon a single passage of a ray at the perimeter of the filter as described in the above example, or upon a second passage (also at the perimeter) through a filter of modified design. In the second example, a mirror may be provided to effect a second passage of the ray through the filter, and the filter may have a shallower design in which the differential phase shift at the limits of the field is only 90° upon a single passage of the beam. After a single passage, the polarization of a ray emerging at the perimeter of the field will be circular. Upon reflection from the mirror, reentry into the filter and a second passage through the filter at the perimeter of the field, the circular polarization of the beam is converted to a linear polarization, rotated 90° from the original P polarization, to an S polarization.

Figure 1B:
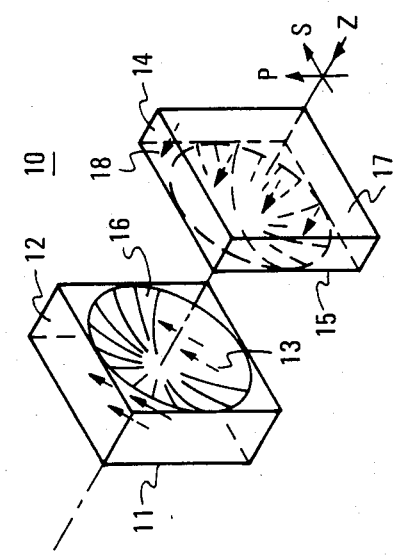

The spherical optical transmission filter may take either the form illustrated in FIG. 1A using two lenses of fixed and equal center thicknesses, or it may take the form illustrated at 20 in FIG. 1B in which a three element construction is used to provide adjustment of the center thickness of one lens in relation to the other. The adjustment may be used to bring the center thicknesses of the two lenses into exact equality or into a desired inequality. The effect of an unequal adjustment is to produce a net differential phase shift on the filter axis and to displace the locus of minimum differential phase shift to a ring around the filter axis. Consistently, when the center thicknesses become unequal, the differential phase shift may become slightly smaller at the peripheral portion of the filter field.

The adjustable spherical optical transmission filter 20, as illustrated in FIG. 1B, consists of a compound left lens 21, 22 and a single element right lens 24. The compound lens is formed of a slideable wedge 21 having flat front and back surfaces and a wedge shaped lens 22 having its flat surface set at an angle orthogonal to the filter axis. When the two elements 21 and 22 are assembled in correctly aligned slideable engagement, with their upper and lower lateral surfaces coplanar, the crystal optic axis of the wedge 21, as illustrated by the arrows 23, has the same rotational orientation as the crystal optic axis of the lens element, as illustrated by the arrows 25. In addition, the angle of tapering of the wedge 21 and the angle of tapering of the lens 22 are made equal so that when assembled and correctly aligned in slideable engagement, the external surfaces of the compound lens 20 are oriented orthogonal to the Z axis. Thus, the positionally dependent differential phase response of the compound three element lens (21, 22, 24) at specific positions of the wedge will be substantially the same as that of a comparable two element lens of that specific thickness In order to permit a fine adjustment of the differential phase shift so that one may adjust the differential phase shift to a small part of a wave length, the angle of tapering of the two lens components (21, 22) is made small enough to effect this precision in adjustment with a conventional micrometer screw. In a particular case, the angle of the wedge is 21 minutes of arc.

Figure 1C:
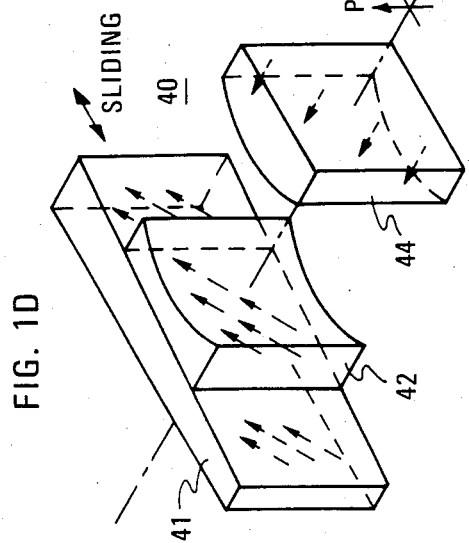

The optical transmission filter 30, illustrated in FIG. 1C is a two piece unit in which two cylindrical lenses are employed and in which the individual lenses (32, 34) are of equal thickness at their centers. As in the FIG. 1A embodiment, the centers of the lens elements (32, 34) are aligned upon the Z axis. The lens 32 placed to the left in the filter 30 has a first surface 31 to the left which is flat and a second surface 36 to the right which is cylindrically concave with a predetermined radius of curvature (R). The curvature is maximum in the S-Z plane and is negligible in the P-Z plane. The surfaces of the lens are oriented orthogonal to the Z axis.

The second lens 34 is placed to the right in the filter. It has a surface 35 to the left (and hidden) which is cylindrically convex with a radius of curvature (R) equal to the first lens but of opposite sign. As with the lens 32, the curvature is maximum in the S-Z plane and negligible in the P-Z plane. When the two lenses 32 and 34 are assembled together, the surfaces are designed to fit closely together. The second surface 37 to the right of the second lens is flat. The surfaces of the lens 32, 34 are oriented orthogonal to the Z axis. The individual lenses 32 and 34 of the filter 30 have their crystal optical axes oriented at a 45° angle to the P and S axes. As before, the crystal optic axis of the lens 32, as illustrated by the arrows 33, is orthogonal to the crystal optic axis of the lens 34, as illustrated by the arrows 38.

The optical transmission filter 30 which is constructed of the two lenses 32 and 34, exhibits a positionally dependent differential phase shift to the polarized rays of light. The differential phase shift varies as a function of the distance of a ray from the center of the filter measured along the S axis. The amount of differential phase shift will be equal for rays at S coordinates of equal magnitude. Assuming equal curvatures for the concave and convex surfaces of the lenses 32 and 34 and an exact match of the thicknesses of the two lenses at their centers, then the differential phase shift provided to selected components of a polarized ray on the axis of the system will be zero. However, if a polarized ray is located at the outer limits of the filter field, at the near and far edges of the cylindrical lenses, light will pass through a greater thickness in the first lens (32) than in the second lens (34) and experience the greatest differential phase shift.

Figure 1D:
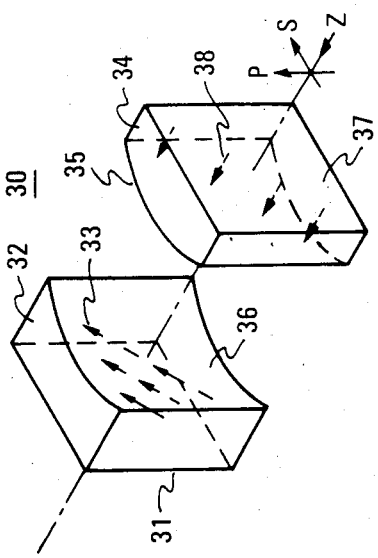

The cylindrical optical transmission filter may also take the adjustable form illustrated in FIG. 1D in which a three element (41, 42, 44) construction is used to provide adjustment of the center thickness of one compound (41, 42) lens in relation to the other lens (44).

The adjustable cylindrical optical transmission filter 40 as illustrated in FIG. 1D consists of a compound left lens (41, 42) cooperating with a right, single element lens 44. The compound lens is formed of a slideable wedge (41) and a wedge shaped lens 42, the two being assemblable to maintain orthogonal external surfaces and parallel crystal optic axes.

As in the prior adjustable configuration, the adjustment may be used to bring the center thickness of the two lenses (41, 42 and 44) into exact equality or into a desired inequality. In the example of an equal center thickness, the differential phase for the selected components of the polarized ray is zero on-axis, and varies equally at equal plus or minus S coordinates.

The effect of an unequal adjustment of the center thicknesses of the lenses 41, 42 and 44 is to produce a net differential phase shift on the Z axis and to displace the locus of minimum differential phase shift to two straight lines parallel to the P coordinate axis spaced at equal S coordinate distances from the Z axis. With the unequal adjustment, the differential phase shift will be smaller at the outer margins of the filter than when the center thicknesses are equal.

In FIGS. 2A through 2E, an optical transmission filter 10 with spherical surfaces, as illustrated in FIG. 1A, is shown in combination with polarizers (51–52), the combination producing a radial attenuation function for P polarized light.

As illustrated in FIG. 2A, the combination is adjusted to provide a minimum attenuation of P polarized light near the Z axis in the filter field and a maximum attenuation near the perimeter of the filter field. Assuming an applied beam, whose cross-section is analogized to a "doughnut" filling the filter field, the filter selects the "hole" of the "doughnut" and rejects the "doughnut". Alternatively the combination may be adjusted to provide maximum attenuation at the central portion of the filter field and minimum attenuation at the peripheral portion of the filter field. Finally, one may make transitional selections intermediate to the first and second adjustments as by using the adjustable filter 20, in which the center of the field is attenuated to a desired degree and the margin of the beam is less deeply attenuated, the effect of which is to increase the spot size of real beams between desired attenuation limits.

In FIG. 2A, it is assumed that unpolarized light at the left margin illustrated by the intersecting vertical (53) and horizontal (54) lines progresses to the right and impinges on the left face of the polarizer 51. Only light which is of P polarization is transmitted through the polarizer 51 while light of an S polarization is ejected off axis and discarded. The nature of the polarization of the light after passage through the polarizer is illustrated in FIG. 2B, which shows a magnified cross-section of the field. In particular, the center of the field, as represented by a single full length vertical line, is vertically polarized. Also the successive zones surrounding the center, and completing the field, are represented by four rows of four radially positioned, full length vertical lines, are vertically polarized. A plot of the light intensity as a function of the radial position of a ray in the filter field is illustrated in the lower portion of FIG. 2B. The field may be regarded as uniformly filled with rays of unit intensity.

The P polarized rays 53 then continue until they impinge on the optical transmission filter 10, which, as indicated by the arrows (13, 18) has its mutually orthogonal crystal optic axes oriented at 45° to the P polarization. The selected orthogonal components of the rays of P polarization, as a function of increasing radial distances from the Z axis, receive greater differential phase shifts upon passage through the filter, and produce correspondingly different polarization rotations.

The rays exiting the filter 10, are symbolized in FIG. 2A by the dots 57, spaced at wave length intervals, which continue until impingement at the polarizer 52.

The effect of the filter 10 over the different zones of the filter field are best illustrated in FIG. 2C, which is a magnified cross-section of the field. The upper portion of FIG. 2C represents the polarization rotation as a function of ray position in successively larger diameter zones lying within the filter field. The lower portion of the figure illustrates the intensity as a function of the radial position of a ray within the field.

The upper portion of FIG. 2C illustrates the progression of the polarization of the output rays from the filter 10, as the input ray position progresses from the center to the perimeter of the filter field. The full length vertical lines represent P polarization; the full length horizontal lines represent S polarization; and the circles indicate circular polarization. Rays at the center of the filter represented by single full length vertical lines have emerged from the filter 10 without a change in polarization and remain of P polarization. Emerging rays at the next zone represented by four circles have been subjected to a 45° polarization rotation and are now circularly polarized. Rays emerging from the next outer zone represented by four full length horizontal lines have been subjected to a 90° polarization rotation and are now horizontally polarized. At the next outer zone, the emerging rays are circularly polarized as represented by four circles. At the final zone pictured, emerging rays are again of P polarization as represented by four full length vertical lines.

The plot of the intensity of the filtered beam as a function of the radial position of a ray is illustrated in the lower portion of FIG. 2C. The FIG. 2C plot resembles the plot provided in FIG. 2B, indicating that the filter 10 has provided no significant attenuation.

The rays having differing polarizations as a function of position within the filter field as a result of passage through the filter 10, next impinge on the left face of the polarizer 52.

Ray components of vertical polarization are transmitted through the polarizer 52 and continue to the right along the Z axis as indicated by the vertical lines 58. Ray components of horizontal polarization are reflected by the polarizer 52, and are ejected from the axis as indicated by the horizontal lines 59.

The effect of the polarizer 52 upon transmitted and reflected rays at different portions of the filter field are illustrated in FIGS. 2D and 2E, which are magnified views of the field.

The effect of the polarizer 52 upon transmitted rays at successive zones of the filter field are illustrated in FIG. 2D. The upper portion of FIG. 2D represents the intensity of the transmitted vertically polarized output rays 58 as a function of ray position in successively larger diameter zones lying within the field. The lower portion of FIG. 2D illustrates the intensity as a function of the radial position of a ray within the field The upper portion of FIG. 2D illustrates the progression of intensity of the output rays as the ray position progresses from the center to the perimeter of the filter field. The intensities are represented by "full" length lines representing full intensity, shortened lines representing less than normal intensity, and dots representing zero intensity. Rays at the center of the field represented by a single full length vertical line have emerged from the polarizer without a change in intensity indicating that the filter-polarizer combination has transmitted that ray without phase shift or attenuation. Emerging rays at the next zone represented by four shortened lines represent the vertical component of rays, which had been circularly polarized, and are now transmitted to the output at less than normal intensity. Rays at the next outer zone, represented by four dots had been subjected to 90° of polarization rotation, and are now rejected by the polarizer, producing a zero output. At the next outer zone, the emerging rays from the polarizer are of reduced length, indicating that they had been derived from previously circularly polarized rays. At the final zone pictured, emerging rays are represented by four full length vertical lines indicating that the rays have been transmitted through the filter-polarizer combination without attenuation.

The lower portion of FIG. 2D illustrates the selection of rays at a broad central zone of the field, the rejection of rays in a narrower second zone surrounding the central zone, the selection of rays in a still narrower third zone, surrounding the second zone by passage of rays of initially P polarization through the filter-polarizer combination.

The effect of the polarizer 52 upon reflected rays is illustrated in FIG. 2E. The upper portion of FIG. 2E represents intensity of the reflected horizontally polarized output rays as a function of ray position in successively larger diameter zones lying within the field. The lower portion of FIG. 2E represents the intensity is a function of the radial position of a ray within the field.

The upper portion of FIG. 2E illustrates the progression of the intensity of the rays 59 reflected off axis as the ray position progresses from the center to the perimeter of the filter field. The intensities are represented as in FIG. 2D. Rays at the center of the filter field represented by a single dot have been subjected to no polarization rotation and are not reflected off axis. Reflected rays at the next zone, represented by four reduced lines represent the vertical component of rays, which had been circularly polarized and are reflected off-axis at less than normal intensity. Reflected rays at the next outer zone represented by four full length horizontal lines, have been subjected to 90° of polarization rotation, and now appear unattenuated, in the off-axis output. At the next outer zone the reflected rays 59 are of reduced length indicating that they have been derived from previously circularly polarized rays. At the final zone pictured, reflected rays are represented by dots indicating that the rays had been transmitted through the filter but not reflected off-axis.

The lower portion of FIG. 2E illustrates the rejection of rays at a broad central zone of the field. The selection of rays of a narrower second zone surrounding the central zone, the rejection of rays in a still narrower third zone surrounding the second zone by passage of rays of initially P polarization through the filter-polarizer combination.

For purposes of introduction to the embodiment illustrated in FIGS. 3A and 3B in which the aperture 67 is a critical element, the cross-section of the aperture 67 has been imposed in the FIG. 2D embodiment illustrating that the aperture 67, if placed in the transmitted output of the polarizer, should be set to allow passage of the broad central zone of the field and be aligned approximately at the lowest point of the second zone surrounding the second zone (a zone of rejection). Thus, the filter, the polarizer and the aperture combine to permit unattenuated passage of a single band of rays slowly going from a minimum to a maximum and returning to a minimum across the physical aperture 67.

The spherical optical transmission filter-polarizer combination may be employed in the cavity of a stable Q-switched laser oscillator for improved operation. The laser oscillator and its operation are explained with reference to FIG. 3A-3C; with FIGS. 4A-4F, 5 and 6 dealing primarily with the Q-switching operation. The filter-polarizer combination is designed to facilitate laser operation in a single $TEM_{00}$ mode and to suppress operation in the $TEM_{01}$ and $TEM_{10}$ modes. The consequence of single mode operation is an improvement in the uniformity of the output beam and in divergence in the far field region.

The combination offsets the tendency of the laser to produce multiple modes as a result of a thermo optical distortion of the laser gain medium or from an increase in the aperture of the resonator. The optical distortion will tend to cause break up of a single mode beam and to cause the development of higher order modes. Decreasing the intracavity beam aperture can be used to control the laser beam mode, but results in a low intensity output and inefficient use of energy stored in a gain medium, since the energy not passed by the aperture is lost.

A typical beam aperture for a single mode rod laser is designed to maintain the Fresnel number $N_f$ at less than 1 in order to obtain the desired mode selectivity; where $N_f = a^2/\lambda L$, in which a is the laser beam radius, $\lambda$ is the laser beam wavelength, and L is the optical resonator length. The small beam aperture required for $TEM_{00}$ mode operation is solely dependent on defraction loss. The Fresnel numbered mode amplitude and phase relationships in a face pumped laser are described in an article entitled "Resonant Mode Analysis of Single Mode Face Pumped Lasers" in *Applied Optics*, Vol. 16, page 1067 and following, on April 1977, authored by M. K. Chun et al. The beam intensity distribution of the $TEM_{00}$ mode is concentrated at the beam center (Gaussian intensity profile), while in the higher order modes the major portion of intensity distribution is away from the beam center. For a number of laser applications, operating in the $TEM_{00}$ mode with the laser energy concentrated at the beam center is essential to efficient laser operation, but limiting the beam aperture to control mode also limits beam energy output. The present embodiment effects increases in energy and in quality of the output beam.

The laser apparatus designed for single mode operation comprises a slab 60 of the gain medium of a square cross-section, optical pumping means 61 arranged adjacent to the upper and lower lateral surfaces of the slab, an optical cavity which includes a first flat partially transparent mirror 62, defining one end of the optical cavity and a second concave spherical mirror 63 defining the other end of the optical cavity, and the wave transmission filter 10, a Pockel's cell 64, a polarizer 52, and an aperture 67 all installed within the cavity. Light rays generated within the slab and passing through the slab, pass through the two end surfaces of the slab, and are coupled to the optical resonator cavity 62, 63. The slab may be either of a Nd:YAG, or Nd:glass or any suitable laser material designed for laser operation. The Pockel's cell 64 and the polarizer 52 cooperate, in operating the optical resonator in a Q-switched mode, the polarizer 52 being the means by which energy is diverted from the cavity to prevent oscillation. The partially transmitting mirror 62 is the point from which the optical output is taken from the cavity.

The optical elements of the laser apparatus of FIGS. 3A and 3B are arranged along the Z axis in prescribed orientations in relation to the P and S axes. As earlier noted, the P and S axes in FIGS. 3A and 3B are established by the rotational orientation of the slab 60 about the Z axis. In particular, the end faces 65 and 66 of the slabs are cut at the Brewster angle in relation to the upper and lower surfaces. The Brewster angle defines an angle at which a ray polarized perpendicular to the upper and lower surfaces of the slab (P polarization) will enter the slab with zero reflection. At the same time, the Brewster cut has the effect of gradually dispersing horizontal polarization, since a horizontally (S) polarized component of a ray will lose a substantial percentage (typically 20%) in reflection upon each passage through the slab.

The laser apparatus illustrated in FIGS. 3A, 3B and 3C produces a short duration high intensity polarized beam of coherent electro-magnetic radiation. The energy for the output beam is supplied to the gain medium 60 by the flash lamps 61 acting as pumps to produce a population increase (or inversion) of high energy electronic states in the gain medium. The energy stored in the gain medium, which accompanies each flash of the flash lamp, is extracted by the optical resonator under the control of the Pockel's cell 64, to effect "Q-switched" short pulse high intensity operation.

In Q-switched operation, the Pockel's cell which is installed within the laser cavity, forms an electrically controlled optical shutter, operating the resonator cavity between a gain prohibiting (low Q) and a gain permitting (high Q) state. The Pockel's cell effects this change by producing a phase rotation to incident light of suitable polarization, when a control voltage is applied to its crystal constituent. The slab 60, as a result of the use of end faces cut at the Brewster angle, tends to form a beam of P polarization. The energized Pockel's cell, which produces a net 90° polarization rotation in the apparatus, combined with the polarizer 52, combines to eject the originally P polarized radiation from the resonating cavity. This reduces the feedback of the cavity resonator below that required for lasing. When the control voltage applied to the Pockel's cell, is removed, the phase rotation disappears, and the feedback of the resonator cavity for rays of P polarization is restored allowing lasing to occur.

Energized operation of the Pockel's cell precludes resonance within the cavity in the following manner. When the Pockel's cell is in an energized state, it produces a net 90° rotation of the polarization to the components of polarized rays experiencing a double passage through the Pockel's cell. The double passage occurs in the leftward path from the slab 60 via the polarizer 52 to the end mirror 63 and in the return path to the right from the mirror 63 via the polarizer 52 to the slab 60. Essentially all of the light impinging on the polarizer 52 from the slab 60 is of a P polarization, and is transmitted to the Pockel's cell. When the Pockel's cell is in an energized state, the double passage which produces a 90° polarization rotation, converts the light from a P polarization to S polarization, in which state it is rejected from the resonator by the polarizer 52 as shown at 68. The ejection of this light reduces the optical "Q" of the resonator cavity below the level required to sustain resonance.

Q-switched short pulse operation occurs in the following sequence. Before a pumping "flash" has occurred a control voltage is applied to the Pockel's cell to preclude resonance and allow the population inversion operation. When the peak (i.e. a maximum population inversion) has been attained, the voltage applied to the Pockel's cell is removed to allow the rapid depletion of stored energy necessary to produce the desired short duration high intensity output pulse. Shortly after the output pulse has occurred, the voltage is reapplied to the Pockel's cell to prevent resonance until adequate energy has been stored to generate a second pulse.

The above sequence of events for Q-switched operation is illustrated in FIGS. 4A through 4F and utilizes the control circuit of FIG. 5. The gain medium is recurrently pumped by flashlamps which has a time dependent optical gain in a laser medium as shown in FIG. 4B, the period of each sequence starting at $t_o$. The voltage necessary to effecting a 90° polarization rotation is applied to the Q-switch prior to $t_o$ and sustained into the flashlamp pumping period as will be described below. As a result of a pumping flash, optical gain in the laser gain medium is created, having a time dependent characteristic as shown in FIG. 4B. As a next step in Q-switched operation, trigger pulses are applied to the control circuit for the Pockel's cell at predetermined times ($t_1$, $t_2$) to cause the Pockel's cell voltage to decay at prescribed rates from the initial value to zero. This induces a controlled depletion of the electronic inversion in the gain medium, allowing resonance in the optical resonator with the controlled onset of amplification in the gain medium. The effect is the production of an output laser pulse of improved beam quality.

The control circuit shown in FIG. 5, is used to operate the Pockel's cell, in the FIGS. 4A through 4F sequence. In the control network of FIG. 5, the electronically controlled switches $S_1$ and $S_2$ are connected via two switching networks to the Pockel's cell (64). These switching networks each entail a capacitor and two resistors. Each capacitor (0.003 microfarad) is connected in series with a 20 megohm resistor, the combination connected in shunt with each switch. The interconnection of a first capacitor-resistor pair is connected to the high voltage terminal of the Pockel's cell via the moderately sized resistor 78 (56K). The inter-connection of the second capacitor-resistor pair is connected to the high voltage terminal of the Pockel's cell via a small sized resistor 80 (50 ohms). One terminal of each switch $S_1$, $S_2$ and the Pockel's cell is returned to ground. A voltage source (not shown) having a value adjusted to produce a 90° polarization rotation for a double beam passage (i.e., a quarter wave differential phase shift) is connected to the control network to operate the Pockel's cell. In the exemplary circuit, the control terminal of the source is connected via three (unnumbered) isolating resistors respectively to the ungrounded terminal of switch $S_1$, of switch $S_2$, and of the Pockel's cell 64. In the example, the voltage required for a KD*P Pockel's cell is 3.2 kilovolts. The negative terminal of the source is connected to ground to complete the energization circuit.

Figure 6:
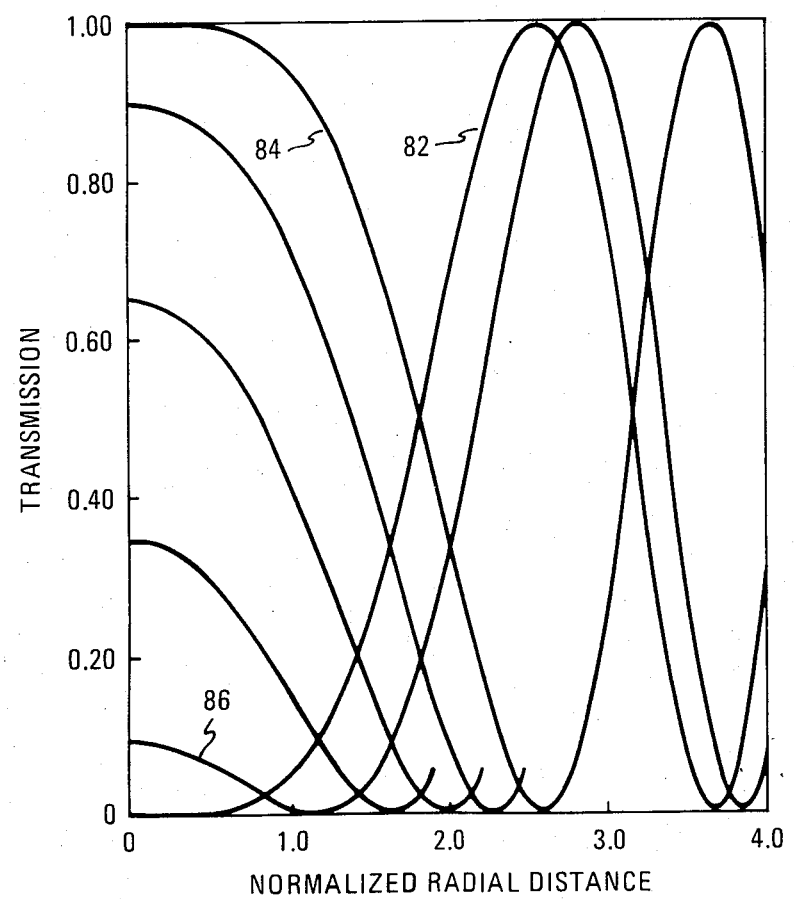
FIG. 6 is a graphical illustration of the transmission profiles for the laser cavity of the FIG. 3A–3B embodiment as a function of the voltage applied to the Pockel's cell during the Q-switching sequence, the process "seeding" the optical resonator for TEM$_{00}$ mode operation.

In the operational sequence, the high voltage is applied to the control network just prior to the time $t_o$ (at which time the flashlamp is turned on) with the electronically controlled switches $S_1$, $S_2$ open. Thus, from just prior to the time $t_o$ and from the time $t_o$ to $t_l$, the Pockel's cell has a constant quarter wave voltage applied, which blocks resonant operation of the optical cavity. This blockage is a function of radial distance from the axis of the optical system, as illustrated by the transmission profile 82 of FIG. 6 and specifically prevents resonance at the fundamental $TEM_{00}$ mode and—resonance in general. In FIG. 6, the radial distance is normalized to the size of the laser beam. At time $t_1$, a voltage spike occurs as shown in FIG. 1C, closing the electronically controlled switch $S_1$, and initiating a discharge of the Pockel's cell at a first slow decay rate. Since the Pockel's cell may be represented as a fully charged capacitor of about 30 picofarads, the voltage on the Pockel's cell will decay with a time constant established by the 56 kilo-ohm resistor 78, and the capacity of the Pockel's cell. The R-C time constant of this discharge path is on the order of a few (e.g. 1–3) micro-seconds and produces the rate of decay shown in FIG. 4D during the period between $t_1$ and $t_2$. During the $t_1 - t_2$ period, the voltage applied to the Pockel's cell will drop gradually to a voltage slightly above the threshold required for single mode operation within the cavity, corresponding to the second transmission profile illustrated at 86 in FIG. 6. The new profile (86) represents a change from the previous profile (82) and permits generation of a slowly growing single mode seed beam. At the time $t_2$, as shown in FIG. 4C, the electronically controlled switch $S_2$ is closed in response to a further control pulse. This closes a second discharge path for the voltage on the Pockel's cell 64 through 50 ohm resistor 80. The R-C time constant of this discharge path is on the order of a few (e.g. 2.0–4.0) nanoseconds, or about one thousandth the time constant for the discharge path through resistor 78. After time $t_2$, a rapid decay of the Pockel's cell voltage occurs, as shown in FIG. 4D. The drop in Pockel's cell voltage allows growth of internal feedback within the resonator cavity, passing through three illustrated intermediate stages until the "final" transmission profile shown at 84 in FIG. 6 is reached. Maximum stimulation of emission occurs in this state and the laser output pulse illustrated at 4F is produced as the population inversion in the gain medium is rapidly dissipated.

The natural decay indicated as a dotted line in FIG. 4B as a result of the stimulation is hastened by four orders of magnitude, producing an actual decay more accurately represented by a vertical solid line. While slopes have been indicated after $t_2$, in the 4B, 4F illustrations, the microsecond and nanosecond periods require mixed time scales for exact illustration. One may explain that approximately 30 nanoseconds after $t_2$, the short duration output pulse of 10 to 30 nanoseconds (represented in FIG. 4F) takes place simultaneously with the actual population depletion (represented in FIG. 4B).

The final transmission profile 84 of FIG. 6 for the FIGS. 3A–3B embodiment corresponds to the transmission profile produced by the filter-polarizer combination which was illustrated in FIG. 2D. When these two elements are present in the resonator cavity, they impose a transmission profile upon the total laser apparatus favoring operation in a $TEM_{00}$ mode and favoring production of an output beam 69 of high purity.

A simple explanation for selection of the $TEM_{00}$ mode in the FIGS. 3A, 3B embodiment is that the transmission profile approximates the Gaussin intensity profile of the $TEM_{00}$ mode. Thus operation in the $TEM_{00}$ mode is facilitated and operation on the higher order modes, which require facilitation by a spacially inconsistent intensity profile, are suppressed. In particular, the beam intensity of the $TEM_{00}$ mode is concentrated near the beam center, while the beam intensity for the higher order modes is distributed over distances remote from the beam center. The filter-polarizer combination of the present invention, provides a nearly lossless optical transmission characteristic is provided to the two next higher order modes. This results in conditioning the optical cavity to maximize operation on the $TEM_{00}$ mode.

The operation of the laser apparatus in effecting selection of the $TEM_{00}$ mode may be further explained by reference to FIG. 3C, which illustrates the radial transmission profile of the filter-polarizer combination in the context of the normal distribution of energy in the three relevent modes. The drawing further illustrates the effect of the aperture 67, which may be regarded as a spacial filter, and the intensity profile of the laser beam. The laser beam profile within the resonator cavity, but after spacial filtering by aperture 67, approximates the profile of the output beam after passage via the mirror 62 and thus the two may be regarded as quite similar.

The upper graph in FIG. 3C illustrates the differential phase shift of the filter 10 as a function of the radial position of an impinging ray. The phase shift is a second power of the coordinate of the ray. The transmission profile of the filter-polarizer combination is the second graph of FIG. 3C. The profile includes a broad central area of high transmission, a narrower (surrounding) second zone of low transmission and a third still narrower, surrounding zone of high transmission. The Gaussian $TEM_{00}$ mode has a somewhat narrower intensity profile than the transmission profile and is passed substantially unattenuated to the output. This is shown at the lowest graph of FIG. 3C which is the intensity profile of the output beam of the laser.

Rejection of the two higher order modes may also be explained using FIG. 3C, which shows these intensity profiles. The next higher order mode, the $TEM_{01}$ mode, has an intensity profile which is low at the beam center and which has two maxima, which occur near the minima of the transmission profile of the filter-polarizer combination. These zones are usually of unlike breadth, and so rejection may not be complete. When, however, an aperture acting as a spacial filter is imposed at approximately the point of minimum transmission in the second zone of the filter-polarizer combination, additional suppression of the $TEM_{01}$ mode will usually occur. The potential contribution of the $TEM_{01}$ mode is thus usually quite small, and in a suitable design, the actual contribution may be negligable.

The second higher order mode, the $TEM_{10}$ mode, is also potentially present but suppressed in the design. This mode has an intensity profile in which the energy is distributed into three peaks of comparable intensity. The central intensity peak of the $TEM_{10}$ mode is at the center of the filter-polarizer transmission profile, which is also a transmission peak. In addition, the two outer peaks of the $TEM_{10}$ mode spacially overlap the two outer transmission peaks of the filter-polarizer combination. Thus the $TEM_{10}$ mode might be expected to be present. The spacial filter 67 rejects the two outer peaks, and thus removes a considerable portion of the $TEM_{10}$ energy, normally enough to suppress that mode. In practice, the mechanism for mode selection in the resonator cavity is interactive, and the rejection of unwanted modes need not be complete to achieve nearly pure $TEM_{00}$ mode operation.

The filter-polarizer combination in the FIG. 3A–3C embodiment produces several major advantages in laser operation. These advantages flow primarily from the suppression of the undesired higher modes and selection of the desired $TEM_{00}$ mode. One consequence of single mode operation is that a higher quality beam both within and without the cavity is produced. In particular, the phase and the amplitude (intensity) across the beam is more accurate and the far field divergence is reduced. A second effect, an indirect consequence of single mode operation, is that when an aperture is employed, of which the edge is placed at the minimum point of the $TEM_{00}$ mode, the aperture becomes a "soft aperture". This implies, that the beam intensity is small at the margin of the aperture and that Fresnel fringes, which would otherwise worsen the quality of the beam at its boundaries are not present.

In the actual design, the cavity is operated in a stable mode in both dimensions, using a filter of spherical design with Fresnel numbers of about four. The beam diameter is approximately 4 millimeters in a slab of 8 by 16 millimeters cross-section. The energy per pulse is approximately 150 millijoules.

The cylindrical optical transmission filter-polarizer combination may be employed in a cavity of a stable/unstable Q-switched laser oscillator for improved operation. The laser oscillator and its operation are explained with reference to FIGS. 7A–7B.

The stable/unstable Q-switched laser oscillator, per se, is the subject of an earlier filed patent application to M. Chun entitled, "Face Pumped Rectangular Slab Laser Apparatus Having An Improved Optical Resonator Cavity" U.S. Pat. No. 4,559,627 issued 12/17/85.

The laser oscillator of FIGS. 7A, 7B comprises a slab 81 of the gain medium of rectangular cross-section, optical pumping means 82 arranged adjacent to the larger lateral surfaces of the slab, an optical cavity which includes a first convex cylindrical mirror 83 defining one end of the optical cavity, and a second concave spherical mirror 84 defining the other end of the optical cavity; and a Pockel's cell 85, a polarizer 86, a rectangular aperture 87, a polarizer 89, and an adjustable cylindrical filter 90 installed within the cavity.

The optical elements of the laser oscillator are arranged along the optical axis (Z axis) of the apparatus as illustrated in both FIGS. 7A and 7B. In a left to right sequence, the concave spherical mirror 84 is first, the Pockel's cell 85 is second, and the polarizer 86, the slab 81, the aperture 87, the polarizer 89, the adjustable cylindrical optical transmission filter 90, and the convex cylindrical mirror 83 follow in succession.

The optical output of the laser oscillator is derived as a reflection from the left face of the polarizer 86 as shown at 98. An unused output 97 also appears as a reflection from the right face of the polarizer 89. The unused output 97 acts as a discard of unwanted energy from the main path of the optical resonator as a result of operation of the polarizer-filter combination (89, 90), which provides a "soft aperture" active along the unstable axis of the resonator. The polarizer-filter combination facilitates operation of the laser-oscillator at high power using a rectangular slab laser at large apertures (e.g. Fresnel numbers of 40, measured along the unstable axis) while still providing an output beam of good quality.

The length (L) of the cavity, the radius (R1) of the convex cylindrical mirror 83 and the radius (R2) of the concave cylindrical mirror 84 define an optical resonator in which stable operation is achieved in a vertical dimension of the beam, the beam being prevented from expanding in the vertical of P dimension beyond the aperture of the oscillator. Unstable operation is achieved in a horizontal dimension, the beam being permitted to expand in the S dimension beyond the apertures of the apparatus.

As noted in the above cited patent application, the slab 81 whose end faces are cut at the Brewster angle has a polarization selective action by which the slab is optically coupled to rays (95) of P polarization transversing the optical resonator defined by the end mirrors 83, 84. In the cited arrangement the Pockel's cell 85 acts as a variable optical power divider within the cavity, capable of facilitating or precluding lasing by adjustment of the light diverted to the output. The Pockel's cell is ordinarily operated at an intermediate setting by which the amounts of light retained within the cavity and the amounts diverted from the cavity to the output are adjusted to optimize the output. At the right of the slab, in the FIGS. 7A, 7B embodiment, the polarizer-filter combination 89, 90 (not present in the cited arrangement), cooperate to provide the soft filtering action noted earlier.

The laser oscillator of FIGS. 7A, 7B oscillates with light pursuing the following path through the resonator rays 95 of P polarization, which have exited the right face of the rectangular laser slab 81, proceed to the right along the Z axis via the polarizer 89 to the filter 90. The vertical lines (95) which continue from the slab 81 via the polarizer 89 to the filter 90 indicate the passage of P polarized light to the filter 90. Upon passage through the filter 90, the polarization components of individual rays of the beam, depending upon the S coordinates of each ray, experience different individual phase shifts which produce differing polarization rotations. The polarization characteristic of the cylindrical filter is comparable to that illustrated in the upper portion of FIG. 2C, which illustrates the polarization rotation over the beam cross-section produced by a spherical filter. The polarization characteristic for the cylindrical unit 90 may be described as lacking the vertical and retaining the horizontal development of the FIG. 2C illustration. More particularly, it may be described as a horizontal section of the FIG. 2C illustration taken through the center of the beam. The rays modified by the filter 90 are thus approximately represented at 96 in FIG. 7A by alternating circles and vertical lines and in FIG. 7B by circles implying some degree of mixed polarization. The filtered rays continue rightward until they impinge upon the convex cylindrical mirror 83.

The mirror 83 has a 100% reflective coating, which causes the rays to be reflected leftwards. The cylindrical mirror 83 is oriented in relation to the axes of the apparatus such that a trace of the mirror in the P-Z plane will be a straight line while a trace of the mirror in the S-Z plane will be a circle having a radius R1.

The rays reflected leftward from the mirror 83 retain the mixed polarization 96 already noted and re-enter the filter 90 at its left face. The rays exit the left face of the filter and proceed leftward until they impinge on the right face of the polarizer 89. Any ray components (95) of a P polarization proceed via the polarizer 89 substantially without reflection to the right end of the slab 81. Any ray components (97) of an S polarization exiting the left face of the filter 90, as shown at 97, proceed to the right face of the polarizer 89 and are reflected off-axis and discarded as shown.

Continuing now to the left of the slab 81, ray components 95 of P polarization exiting the left face of the slab 81 continue via the polarizer 86 to the Pockel's cell 85, passing through the polarizer substantially without reflection. Assuming that the Pockel's cell is in a suitably energized condition to effect a 45° polarization, rays components entering the Pockel's cell 85 from the right of a P polarization are subjected to a polarization rotation of 45° producing circular polarization as shown at 99 in FIGS. 7A and 7B. Upon reflection from the concave spherical mirror 84, and a second passage through the Pockel's cell 85, the ray components 95 previously of circular P polarization, are rotated an additional 45° converting them to S polarization (98). Upon impinging upon the left face of the polarizer 86, the components 98 of S polarization are directed off-axis forming in the main output path of the laser oscillator.

The illustrative Pockel's cell setting is one which reduces the feedback within the optical resonator to zero, and is used to extinguish oscillation. In practice, the voltage on the Pockel's cell is an intermediate selection in which a division occurs between light derived from the cavity, and that allowed to remain in the cavity.

In operation of the stable/unstable resonator, the beam which has pursued the paths described, is periodically refocused in the P dimension by the curvature of the spherical mirror 84 and the mirror 83, effectively flat in the P dimension. The optical design of the resonator is thus chosen to provide a reasonable beam size within the laser material. The vertical dimension of the beam is typically approximately half the cross-section of the laser slab, e.g. 4 millimeters, with Fresnel numbers of about 4. The other design dimensions are as follows: slab 139.37 mm long, 15 mm wide, 8 mm thick, R1 is 6 meters, L (cavity length) is 1 meter.

Along the unstable axis, i.e. the S dimension modes are not formally defined, and individual rays, when traced through the cavity, "walk off" the lateral apertures of the apparatus. In a practical embodiment, the radius of curvature of the cylindrical mirror ($R_2$) is 4 meters, producing a "G" stability factor of 1.25. While higher Fresnel numbers are permitted (e.g. 40), the quality of the beam is disturbed by Fresnel defraction effects at the lateral edges of the aperture if the filter-polarizer combination is not present. A tapering of the intensity profile of the beam in the S dimension provides a significant improvement in beam quality, or conversely, permits higher power operation or larger apertures at the same beam quality.

The filter-polarizer combination 90, 89 illustrated at the right of the FIG. 7A, 7B embodiment produces a "soft" lateral aperture reducing the edge diffraction effects. Typically the design of the filter 90 is adjusted in relation to the lateral edges of the aperture so as to produce a null at the aperture edges to waves transmitted through the polarizer 89 corresponding to the intensity plot illustrated at the lower portion of FIG. 2D. The reflected waves are ejected from the cavity as illustrated at the lower plot of FIG. 2E.

The benefit of the filter-polarizer combination in the FIG. 7A, 7B cofiguration, is primarily the consequence of a "soft" lateral aperture in which a graduated attenuation generally following the curves in the FIG. 2B–2E series is produced along the S coordinate of the aperture. The primary effect is the avoidance of Fresnel edge defraction effects by reducing the beam amplitude at the lateral margins of the aperture. The intensity at these margins would remain unacceptably high without such a reduction. The lateral amplitude adjustment, recognizing that the modes are undefined along the unstable axis, permits a somewhat more efficient extraction of stored energy from the slab by using more of the width dimension of the slab.

In a practical application, the filter 90 may take either the nonadjustable form illustrated in FIG. 1C or the adjustable form in FIG. 1D. In principle, the central thicknesses of the two components of the filter should be equal, and achievement of equality is most easily achieved by the adjustable arrangement.

The filter-polarizer combination may also be used to advantage in more fully utilizing the interaction volume of a laser amplifier used to amplify the output of a laser oscillator as shown in FIG. 8A. A Gaussian intensity profile 114 from a laser oscillator 101 operating in a single transverse mode (TEM$_{00}$) may be converted to a more nearly "flat top" beam intensity profile 115 by operation of the filter-polarizer combination 103, 104, 105, before application to the input aperture 107 of a laser amplifier 108. The "flat top" beam intensity profile 115 is preferrable in order to obtain a more efficient extraction of stored energy from an amplifier.

The apparatus illustrated in FIG. 8A functions in the foregoing manner. The output of the laser oscillator 101 as indicated by the vertical and horizontal marks 109 and 110, may be assumed to contain some components of both P and S polarization, but P polarization is the primary polarization. The output of the oscillator may otherwise be assumed to exhibit an ideal Gaussian amplitude profile as more accurately illustrated at 114 in FIG. 8C. The laser oscillator output proceeds to the right impinging next on the polarizer 103 which transmits light of P polarization to the filter 104 and ejects light of S polarization from the transmission path. The polarizer 103 is not essential to the operation of the system to the degree that the output of the laser oscillator is restricted to P polarization. The filter 104 is preferably an adjustable spherical two lens filter as illustrated in FIG. 1B. The first lens of the filter is a compound lens which includes a slideable wedge for adjusting the center thickness of the first lens in relation to the center thickness of the second lens. The crystal optical axes of the two lenses of the filter 104 are mutually perpendicular and are oriented at a 45° angle to the P coordinate. The curvatures of the lenses are selected to provide the desired polarization rotation in a single passage of the beam through the filter. The radius of the lens curvature is in turn determined by the design cross-section of the beam. In particular, for the single passage design, a spot diameter of 0.90 centimeters requires a radius of curvature of approximately 33 centimeters. (For double passage the radius of curvature is approximately double.)

The filtered light next impinges on the polarizer 105 which is oriented parallel to the polarizer 103, for transmission of ray components of P polarization and reflection of components of S polarization. Due to the polarization rotation produced by the filter 104, components of S polarization appear and are ejected by reflection from the transmission path by the polarizer 105. The transmitted remainder is supplied to the aperture 104 of the laser amplifier 108. The justification of a spherical design for the filter lenses has been on the assumption that the interaction cross-section of the laser material is square, and that the entrance aperture 114 is circular. The spherical design will produce an improvement in the fill factor along both the P and S coordinates of the beam.

The transmission profile of the filter polarizer combination is illustrated in FIG. 8B for five different adjustments of the center thickness of the first lens. The independent variable in FIG. 8B is the beam radius and dependent variable is the relative optical transmission. The entrance aperture 107 of the laser amplifier should be adjusted to lie just within the desired interaction cross-section of the active laser material of the amplifier. The entrance aperture 107 is set at the minimum of the transmission characteristic to minimize Fresnel fringing. When the lenses have equal center thicknesses, the transmission profile 111 is followed. This profile remains near unity until nearly 0.2 of the beam radius; falls to approximately 85% at 0.4 of the beam radius and then falls to zero at approximately, 0.8 of the beam radius, where the aperture should be set.

As the center thickness difference increases, however, the transmission at the center of the profile falls, and the beam width increases. In the right most member (112) of the family of curves, the beam width provides 0.85 transmission at the center of the beam. The width of the beam at the 0.85 transmission point is increased from approximately 0.4 to 0.55 of the beam radius. The width of the beam measured at the low point shifts from approximately 0.8 to 0.09, and defines a new position for setting the entrance aperture of the laser amplifier.

The beam "fill factor" may be increased in typical cases from a value of 40% to 70% using suitable design parameters. The "fill factor" is defined as the fraction of the volume of the lasing material occupied by the beam in relation to an idealized case in which the volume of the lasing material is completely filled with full intensity illumination. At constant amplitude, the sharp edge of the aperture acting upon the idealized beam would cause severe Fresnel diffraction effects. Accordingly, a "fill factor" substantially less than 100% is a practical and desirable compromise.

An illustration of a more nearly optimum transmitted beam profile achieved by application of the present invention is shown in FIG. 8C. In FIG. 8C, the intensity of a Gaussian input beam is shown at 114, the transmission of the filter-polarizer combination is shown at 113, and the intensity of the transmitted beam with an improved profile is shown at 115. In the calculated graph of FIG. 8C. The intensity of the transmitted beam remains substantially constant to approximately 0.35 of the beam radius and falls to zero at slightly under 0.90 of the beam radius. The entrance aperture 107 should be set to this value. The transmission curve 113 employed in FIG. 8C is an intermediate one, second from the right of those illustrated in FIG. 8B. The filter-polarizer combination can provide widely varying transmission characteristics. The radial position dependent phase shift can be controlled with a birefringent lens having one flat face and a positive or negative curvature on its opposite face, defined by $$\delta(r) = (2\pi \Delta n/\lambda)[t \pm r^2/2R]$$

in which
t = the center thickness of the lens
R = the radius of curvature of the lens
r = the radius of the lens
$\Delta n$ = the birefringence
$\lambda$ = the wave length of the light beam.

The ideal homogenous linear phase retardation matrix is $$M_r = \begin{bmatrix} A & jB \\ jB & A^* \end{bmatrix}$$

where $A = [\cos(\delta/2)] + j[\sin(\delta/2)\cos 2\theta]$, $A^*$ equals the complex conjugate of A, B equals $\sin(\delta/2)\sin 2\theta$, $\delta$ equals the phase retardation angle (i.e. the differential phase delay) and $\theta$ equals the azimuth angle of the crystal optic axes in relation to reference (P) polarization. The transmitted intensity when $\theta$ is 45° is $$T(r) = \cos^2[\delta(r)/2].$$

The matching set of equal but opposite curvature phase retardation plates can avoid a lensing effect avoiding an unwanted beam expansion. By choosing a proper combination of a radius of curvature R, thickness t, and azimuth angle $\theta$, a wide variety of transmission characteristics for a particular wavelength for a particular gain medium with a filter unit combined with a polarizer can be selected.

The matrix relation in the case of two lenses placed between two parallel polarizers as shown in FIG. 2 can be written as $$M = \begin{bmatrix} 1 & 0 \\ 0 & 0 \end{bmatrix} \begin{bmatrix} A_1 & jB_1 \\ jB_1 & A_1^* \end{bmatrix} \begin{bmatrix} A_2 & jB_2 \\ jB_2 & A_2^* \end{bmatrix} \begin{bmatrix} 1 & 0 \\ 0 & 0 \end{bmatrix}$$

$$= \begin{pmatrix} A_1A_2 - B_1B_2 \\ 0 \end{pmatrix}$$

where
$A_i = [\cos(\alpha_i/2)] + j[\sin(\alpha_i/2)(\cos 2\theta_i)]$,
$B_i = [\sin(\alpha_i/2)(\sin 2\alpha_i)]$, and
$\alpha_i$ = the phase retardation angle in $A_iB_i$.

Therefore, the transmitted intensity T where $T = M \times M$ $$T = (A_1A_2 - B_1B_2)^*(A_1A_2 - B_1B_2),$$

and $$T = \cos^2(\alpha_1/2 - \alpha_2/2),$$

for $\theta_1 = 45°$ and $\theta_2 = 45°$ (the orthogonal arrangement of the crystal axes)

for the matching concave and convex phase-plates, $$T(r) = \cos^2\left[\frac{\pi \Delta n}{\lambda}(t_1 - t_2 + (r^2/R))\right]$$

where
r = the radius,
R = the radius of curvature,
$\Delta n$ = the birefringence,
$t_1 - t_2$ = the center thickness difference,
$\lambda$ = the wavelength.

As noted earlier, with unequal center thicknesses, the maximum transmission is displaced from the center. When the center thickness of both lenses is equal, the maximum transmission is displaced from the center. When the center thickness of both lenses is equal, the maximum transmission is obtained at the center, i.e. r=0. For the case of equal lens thicknesses, $t_1 - t_2 = 0$, and the two-pass transmission can be expressed as $$T(r) = \cos^2[2\pi \Delta n r^2/R\lambda]$$

The radius of the curvature of the phase plates, R, is selected upon the basis of the desired beam spot size. The equation indicates that the transmission of light at the center of the phase plates will be nearly 100 percent by selecting the design parameters for the plates of the zero order spherical retardation unit, the intercavity beam radius may be expanded to maximize utilization of the laser gain medium and simultaneously maintain the beam transmission characteristics at their optimum values over the radius of the beam.

FIGS. 9A, 9B and 9C deal with usage of the filter of FIG. 1B in particular, for phase correction of the output beam of a laser source. When the filter is properly designed and adjusted, a simple, efficient and practical means is provided to improve beam quality in large aperture face pumped laser resonators and amplifiers. The correction derives from a mathematical analysis of resonator mode formation and the far field diffraction of beams formed under these circumstances. The radial phase deviation of the beam within the resonator increases as the Fresnel number of the resonator increases and the far field beam, which is formed in such a resonator, has a divergence which increases as the radial phase deviation of the beam within the resonator increases. When a properly designed and adjusted phase correction filter is applied to the output of such a resonator, or amplifier, optimized to produce a reduction in far field beam divergence, then the output beam quality is improved without deleterious side effects. The improvement has application to resonators where large Fresnel numbers are involved, involving both stable or unstable resonators.

While the correction has application to the radial phase deviation of a resonator, it should be noted that the correction may be applied with good effect to the output of an optical amplifier. The phase correction scheme may be applied to certain optical amplifiers which have an internal radial phase deviation or to those whose input has been supplied from a resonator having the indicated radial phase deviation.

With a face pumped laser (FPL) having a rectangular-slab geometry, such as is illustrated in FIGS. 7A, 7B, it has been possible to generate a large Gaussian intensity profile of the beam. Despite the fact that beam intensity profile is similar to that of a Gaussian intensity beam in the TEM$_{00}$ mode, the measured far field beam divergence of this large Gaussian beam has been several times larger than the diffraction limited case. Thus the presence of an apparent Gaussian intensity profile will be a necessary but not a sufficient condition for diffraction limited beam divergence.

Analysis, indicates that with such a beam, that the radial phase deviation between the beam center and edge will increase as the Fresnel number of the resonator increases. This is also true for both the stable and the unstable case. Furthermore, the radial phase deviation will increase for a fixed resonator-cavity length as the beam aperture size increases.

Applying the Hugens-Fresnel principle, each point in a resonator mode is based on the contributions from all the points on an opposite resonator reflector. Thus, as the Fresnel number of the resonator increases, the radial phase variation of the mode increases due to the increased path length differences from all the points of an opposite resonator reflector.

The resonator modes may be analyzed based on the Kirchhoff-Fresnel diffraction theory. In the one-dimensional case $$\gamma u(x_2) = \int_{-a_1}^{a_1} K[x_1, x_2] u(x_1) dx_1$$

where
  $u(x_2)$ : the resonator mode (eigenvector) at the reflector 2
  $\gamma$ : the mode reduction factor (eigenvalue)
  $K[x_1,x_2]$: the geometry of resonator (kernel)
  $X_1, x_2$: the coordinate at reflector 1, and 2
  $a_1$: the half dimension of aperture at reflector 1.

From the above, one can define the resultant mode $u(x)$ as $$u(x) = A(x) \exp[-i\phi(x)]$$

where
  $A(x)$ : the mode amplitude
  $\phi(x)$ : the coordinate dependent phase of mode.

The far field beam divergence can be estimated by the far field integration of the resonator mode, which can be performed based on the Fraunhofer diffraction theory, which provides the basis of diffraction-angle-dependent far field beam (V(p)):

$$V(p) = \int_{-a}^{a} u(x) \exp[-ikpx] dx$$

where
  $k = 2\pi/\lambda$: the wavevector
  $\lambda$: the wavelength
  $u(x)$ : the resonator mode
  p : the diffraction angle coordinate
  x : the physical coordinate
  a : the half dimension of aperture.

Thus, the diffraction angle dependent far field beam intensity will be $$I(p) = V(p)^2 \exp[-if(p)]$$

where
  $f(p)$ : the angle dependent phase of far field intensity
  P : the diffraction angle.

The diffraction-angle-dependent far field intensity patterns of resonator modes are of the general form shown in FIGS. 9B and 9C becoming successively more divergent as the equivalent Fresnel numbers increase. In the range of 2.5 to 7.5, the beam width changes from 5 mm to 8.75 mm, and the maximum phase deviation of the mode increases from about 1.2 to 5.1 times the diffraction limited beam divergence.

Figure 9D:
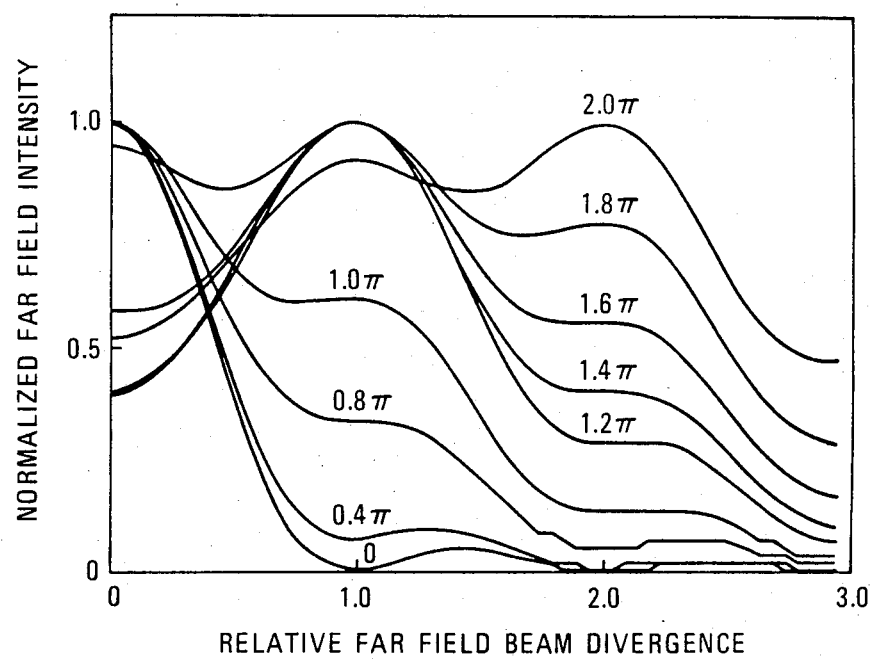
FIG. 9D illustrates the effect of phase deviation across the beam or far field beam divergence.

The effect of phase deviation in the far field is illustrated in FIG. 9D. The horizontal coordinate is the relative far field beam divergence and the vertical coordinate is the normalized far field intensity. The individual curves are plotted for differing phase deviations, the "phase deviation" being the observed phase difference between the center and the beam edge for a constant amplitude beam (far field). The individual curves are plotted at $0.2\pi$ intervals from zero to $2\pi$. The maximum phase deviation plotted ($2\pi$) exhibits the greatest far field beam divergence and the lowest phase deviation (uniphase) produces the diffraction limited far field beam divergence.

FIG. 9D illustrates that the greater the maximum phase deviation of the mode, the greater the far field beam divergence. When the phase deviation increases, the peak intensity moves out from the center of the beam and the beam divergence increases. In short, the beam width, phase deviation of the modes, affect the far field divergence of the output beam.

Analysis indicates that in unstable resonators the phase deviation across the beam increases rather smoothly as the beam aperture size increases. Analysis also indicates that the same rate applies in stable resonators with large Gaussian modes. Therefore, it is possible to model this phase deviation as being created by a simple quartz radial phase plate, and to use the model to make a corresponding correction.

$$\phi(r) = (2\pi \Delta n/\lambda)[1 + (r^2/2R)]$$

where
  $\Delta n$ : the birefringence
  $\lambda$ : the wavelength
  r : the radial distance
  l : the center thickness
  R : the radius of curvature A computed equivalent radius of a quartz lens may be obtained from the above radial phase relation for different sampling points of beam aperture. FIGS. 9B and 9C demonstrate, for the unstable resonator and stable resonator, respectively, the far field intensity improvement that is obtained through this phase correction scheme.

The phase correction provided in the FIG. 9B and 9C examples may be seen to produce a far field divergence of less than twice that of a diffraction limited beam.

The FIG. 9A embodiment, which may be adjusted to provide the correction of either the FIG. 9B or 9C example, consists of a laser source 110, the adjustable spherical filter 111, similar to that provided in FIG. 1B, and for convenience, the focusing lens 112 of coherent accuracy for focusing the beam upon the screen 113. An intensity plot of the beam cross-section is provided at 114 as it impinges on the screen 113. The lens element 112 is provided to permit the reproduction of far field conditions within the confines of a room. For purposes of accuracy, the focal length of the lens should be as large as possible consistent with available space and its surfaces must be of fractional wave accuracy so as not to introduce error. In the absence of the lens 112, the far field pattern may be examined at the nearest measurement distance appropriate for far field conditions.

The FIG. 9B filter utilizes quartz in an adjustable design using cylindrical lens surfaces. The component lenses have a center thickness difference of 0.0716 centimeters, and a radius of curvature of 7.11 cm. Using "S" coordinate measurements, the beam width is 8.75 mm, the "equivalent" Fresnel number is 7.5 and the magnification of the resonator optics is 1.5.

The FIG. 9C filter is also of quartz in an adjustable design using spherical surfaces. The radii of curvature of the lenses are 29.56 cm and the center thickness difference of the lenses is 0.0534 cm. The beam width is 6 mm, the Fresnel number is 8.5 and the parameter is 0.83.

The phase correction as described with reference to FIGS. 9A, 9B, 9C and 9D has a primary application to laser systems in which a polarized output beam is provided and in which Fresnel numbers exceed 2 or 3. The improvement is also applicable to laser systems of larger apertures (i.e. Fresnel numbers as large as 40) where the beam approximates a smooth Gaussian or a "flat top" profile. In practical examples, corrections have been achieved for beams both under and over a $\pi$ phase deviation. Phase deviations beyond $2\pi$ appear to represent a practical upper limit for substantial phase correction.

The phase compensation, herein provided may be applied using a filter with matched spherical lenses in the case that the phase deviation of the beam has circular symmetry as in a stable resonator or an unstable resonator. In the event that the resonator is a stable/unstable resonator, then the phase compensation may entail separate cylindrical elements for separately compensating the phase deviation along the stable and unstable axes. While the compensation has been applied for improvement of the far field beam, in the typical case, near field beam conditions are also improved.

The adjustable form of the filter herein disclosed is useful in that it removes one critical variable in the prescription of the filter and adds flexibility in a given laser system application.

In far field correction, there are three circumstances in which the beam formed by an optical resonator may require phase correction. In the beam formed in an unstable resonator, adjustable spherical optics are appropriate. In the beam formed in a stable/unstable resonator, adjustable cylindrical optics are appropriate. In both cases, where formal mode structure is absent, the phase deviation increases significantly as the margin of the beam is approached. The third circumstance requiring correction is where the beam is created in an optical resonator in which the fundamental mode, while paramount, is accompanied by some contributions from other higher order modes. In far field correction, the phase deviation correction ordinarily need not be zero on-axis, is generally small and increases as the radial distance of the beam element increases.

In the near field application, where the beam profile is being modified and the filter is used in combination with polarizers, the adjustability feature allows one to select the distance from the axis at which the phase correction goes through zero changing from positive to a negative sense and the transmission is maximum. In profile modification, adjustability is also important for optimized performance.

The filter 10 employed in the stable resonator of the FIG. 3A-3B embodiment uses spherical lenses of equal center thickness in which the radii of curvature of the spherical surfaces are 29.72 cm, the assumed beam diameter being 6 mm. The filter 90 employed in the stable/unstable resonator of the FIG. 7A-7B embodiment has radii of curvature equal to 82.54 cm, measured in a horizontal plane along the unstable (S) axis. The filter 90 is of an adjustable construction and accordingly, the adjustment is set for optimum performance at equal center thicknesses. The larger transverse dimension of the beam in the stable/unstable resonator is one cm.

What is claimed is:

1. An optical transmission filter for effecting continuous phase compensation of a beam of light polarized in a P dimension, the elements of said beam having a phase which deviates from an ideal reference phase as a continuous function of element position, said filter having an optical axis which is concentric with the beam axis and comprising:
    A. a first lens of birefringent material of a first center thickness having a first surface which is flat and a second surface which has a predetermined radius of curvature,
    B. a second lens of birefringent material of a second center thickness having a first surface which is flat and a second surface which has a radius of curvature equal to the radius of curvature of said first lens but of opposite sign,
    the surfaces said lenses being oriented orthogonal to and concentric with said optical axis, the crystal optical axes of the materials of said lenses being oriented in orthogonal positions along said optical axis and at angle of 45° to said P dimension, with said second surfaces adjacent.

2. An optical transmission filter as set forth in claim 1 wherein:
    the second surface of each of said filter lenses is spherical to effect a differential phase delay which is a continuous function of the radial distance of each beam element from the axis of the filter.

3. An optical transmission filter as set forth in claim 2 wherein:
    the second surface of each of said filter lenses is cylindrical to effect a differential phase delay which is a continuous function of a coordinate of each beam element referenced to the beam axis in a plane orthogonal to said beam axis and in the plane of said curvature.

4. An adjustable optical transmission filter for effecting a differential phase delay upon light in a beam polarized in a P dimension as a continuous function of position, said filter having an optical axis which is concentric with the axis of said beam, and comprising:
    A. a first lens of birefringent material of a first center thickness having a first surface which is flat and a second surface which has a predetermined radius of curvature, the surfaces of said lens being oriented orthogonal to and concentric with said optical axis;
    B. a second, compound lens of birefringent material of an adjustable center thickness, having a first surface which is flat and a second surface which has a radius of curvature equal to the radius of curvature of said first lens but of opposite sign, said second lens consisting of,
    a wedge shaped first lens element with flat surfaces, having a cross-section tapered at a first angle, and a second lens element having a crosssection tapered at said first angle, assembled in sliding engagement with said wedge shaped lens element, the external surfaces of said compound lens being oriented orthogonal to and centered on said optical axis, said angle of taper being small enough to permit adjustment of the differential delay accorded to transmitted light to a fraction of a wave length as said lens elements are mutually displaced, the crystal optical axes of the materials of said lenses being oriented in mutually orthogonal positions along said optical axis and at an angle of 45° to said P dimension with said second surfaces adjacent, the lenses providing compensatory phase shift over the cross-section of said beam.

5. An adjustable optical transmission filter as set forth in claim 4 wherein:

the second surface of each of said filter lenses is spherical to effect a phase compensation which is a continuous function of the radial distance of each beam element from the axis of the filter.

6. An adjustable optical transmission filter as set forth in claim 5 wherein:

the adjustment range of the difference in center thicknesses includes an adjustment in which a small differential phase delay occurs on-axis and a large differential phase delay occurs at the perimeter of the beam.

7. An adjustable optical transmission filter as set forth in claim 5 wherein:

the adjustment range of the difference in center thicknesses includes an adjustment in which a substantially zero differential phase delay occurs on-axis and a maximum differential phase delay occurs at the perimeter of the beam.

8. An adjustable optical transmission filter as set forth in claim 5 wherein:

the adjustment range of differences in center thicknesses includes an adjustment in which a substantial differential phase delay occurs on-axis, a zero differential phase delay occurs at an intermediate radial distance, changing in sense at this distance, and a substantial differential delay again occurs at the perimeter of the beam.

9. An adjustable optical transmission filter as set forth in claim 4 wherein:

the second surface of each of said filter lenses is cylindrical to effect a phase compensation which is a continuous function of a coordinate of each beam element referenced to the beam axis in a plane orthogonal to said beam axis and in the plane of said curvature.

10. An adjustable optical transmission filter as set forth in claim 9 wherein:

the adjustment range of the difference in center thicknesses includes an adjustment in which a small differential phase delay occurs at the zero coordinate value and a large differential phase delay occurs at a maximum coordinate value at the perimeter of the beam.

11. An adjustable optical transmission filter as set forth in claim 9 wherein:

the adjustment range of the difference in center thicknesses includes an adjustment in which a substantially zero differential phase delay occurs at the zero coordinate value and a maximum differential phase delay occurs at said maximum coordinate at the perimeter of the beam.

12. An adjustable optical transmission filter as set forth in claim 9 wherein:

the adjustment range of differences in center thicknesses includes an adjustment in which a substantial differential phase delay occurs at the zero coordinate value, a zero differential phase delay occurs at an intermediate coordinate value, changing in sense at this value, and a substantial phase delay again occurs at said maximum coordinate value at the perimeter of the beam.

13. A laser apparatus comprising:

first and second reflector means disposed in optical alignment for defining a resonant cavity therebetween;

an active laser medium for producing a beam of coherent electromagnetic radiation disposed between and in optical alignment with said first and second reflector means; and optical mode control means disposed within said resonant cavity in optical alignment with said laser medium for shaping the optical transmission characteristics of said resonant cavity to maximize transmission of a desired transverse electromagnetic mode of electromagnetic radiation.

* * * * *